US012571227B2

(12) United States Patent
Beeman

(10) Patent No.: US 12,571,227 B2
(45) Date of Patent: Mar. 10, 2026

(54) RECREATIONAL VEHICLE DOCKING SYSTEM AND METHODS FOR PROVIDING SAME

(71) Applicant: Gary J. Beeman, Park Rapids, MN (US)

(72) Inventor: Gary J. Beeman, Park Rapids, MN (US)

( * ) Notice: Subject to any disclaimer, the term of this patent is extended or adjusted under 35 U.S.C. 154(b) by 224 days.

(21) Appl. No.: 17/839,349

(22) Filed: Jun. 13, 2022

(65) Prior Publication Data

US 2022/0396960 A1      Dec. 15, 2022

Related U.S. Application Data

(60) Provisional application No. 63/209,481, filed on Jun. 11, 2021, provisional application No. 63/332,325, filed on Apr. 19, 2022.

(51) Int. Cl.
| | |
|---|---|
| *E04H 6/28* | (2006.01) |
| *B60S 13/02* | (2006.01) |
| *E04H 3/02* | (2006.01) |

(52) U.S. Cl.
CPC ............. E04H 6/282 (2013.01); B60S 13/02 (2013.01); E04H 3/02 (2013.01)

(58) Field of Classification Search
CPC ... E04H 6/282; E04H 6/40; E04H 3/02; B60S 13/02
See application file for complete search history.

(56) References Cited

U.S. PATENT DOCUMENTS 2,691,448 A * 10/1954 Lontz ..................... E04H 6/422
                                                    194/902
3,055,517 A * 9/1962 Kirkland ................. E04H 6/282
                                                    414/249

(Continued)

FOREIGN PATENT DOCUMENTS

| | | | | |
|---|---|---|---|---|
| DE | 29716641 | * | 9/1997 | .............. B60S 13/02 |
| DE | 102019109494 A1 * | 10/2020 | | |
| WO | WO-2022261563 A1 * | 12/2022 | ............... E04H 3/02 |

OTHER PUBLICATIONS

Translation of DE29716641 (Year: 1997).*
English Translation of DE 10 2019 109494 (Year: 2020).*

*Primary Examiner* — Andrew J Triggs
(74) *Attorney, Agent, or Firm* — Eckert Seamans Cherin & Mellot, LLC

(57)          ABSTRACT
Parking systems and methods for vehicles, such as recreational vehicles (RVs), buses, trucks, automobiles, and the like, and road-configured or road-transportable accommodation spaces. The systems and methods offer enhanced ease of parking, increased parking density, and additional amenities that may find use in recreational, service, and work locations. The systems include a parking loop having a plurality of parking pads radially spaced about a central region, and a turntable positioned within the central region, wherein the turntable includes a road portion that provides admission from an access road to each of the plurality of parking pads when aligned therewith. Each parking pad may include an accommodation area, and the parking loop may further include a community space positioned over the central area and accessible via at least a loft portion of each of the accommodation areas.

20 Claims, 11 Drawing Sheets

(56)　　　　　　References Cited

U.S. PATENT DOCUMENTS

| | | | | | | |
|---|---|---|---|---|---|---|
| 3,079,871 | A | * | 3/1963 | Brodie | .................... | B60S 13/02 |
| | | | | | | 104/44 |
| 3,395,815 | A | * | 8/1968 | Johnson | ................. | E04H 6/282 |
| | | | | | | 414/247 |
| 3,419,161 | A | * | 12/1968 | Hagel | .................... | E04H 6/285 |
| | | | | | | 187/250 |
| 4,264,257 | A | * | 4/1981 | Saurwein | ................ | E04H 6/287 |
| | | | | | | 414/253 |
| 4,265,581 | A | * | 5/1981 | Ives | ........................ | E04H 6/287 |
| | | | | | | 414/254 |
| 4,594,044 | A | * | 6/1986 | Soot | ........................ | E04H 6/282 |
| | | | | | | 414/263 |
| 4,608,929 | A | * | 9/1986 | Park | ........................ | B60S 13/02 |
| | | | | | | 104/44 |
| 4,998,856 | A | * | 3/1991 | LaBarre | ................. | E04H 6/282 |
| | | | | | | 414/243 |
| 5,173,027 | A | * | 12/1992 | Trevisani | ............... | E04H 6/183 |
| | | | | | | 414/241 |
| 5,469,676 | A | * | 11/1995 | Colsman | ................ | E04H 6/285 |
| | | | | | | 52/65 |
| 5,478,182 | A | * | 12/1995 | Hildebrand | ............ | E04H 6/282 |
| | | | | | | 414/257 |
| 5,980,185 | A | * | 11/1999 | Vita | ........................ | E04H 6/422 |
| | | | | | | 414/256 |
| 8,632,290 | B2 | * | 1/2014 | Alan | ....................... | E04H 6/282 |
| | | | | | | 414/253 |
| 9,255,420 | B2 | * | 2/2016 | Dezer | ....................... | E04H 6/42 |
| 2005/0095092 | A1 | * | 5/2005 | Segal | ...................... | E04H 6/245 |
| | | | | | | 414/263 |
| 2022/0396960 | A1 | * | 12/2022 | Beeman | ................... | E04H 6/40 |

* cited by examiner

200

210

205

12

110a

200

10

12

RECREATIONAL VEHICLE DOCKING SYSTEM AND METHODS FOR PROVIDING SAME

CROSS REFERENCE TO RELATED APPLICATIONS

This application claims priority to U.S. Provisional Patent Application Ser. No. 63/209,481 filed Jun. 11, 2021, and 63/332,325 filed Apr. 19, 2022, which are incorporated herein in their entirety.

FIELD OF INVENTION

This disclosure generally relates to systems and methods for docking large vehicles and modular accommodation spaces, and providing accommodation spaces thereto; and to methods and software applications that provide reservation and tracking of available docking and/or accommodation spaces.

BACKGROUND

Traveling and exploring using recreational vehicles, or RVing, is becoming a more and more popular way to travel in the United States. Traditional locations for parking such vehicles include a narrow pad having electric and possibly plumbing linkages, but not much else. Additionally, maneuvering the vehicle into such a space requires tight turns from the access road onto the pad, and typically requires the assistance of a spotter to avoid damage to the vehicle and/or areas surrounding the parking pad. As individuals age, their spatial judgement degrades, thus compounding the problems associated with parking such large vehicles.

Along with the increase in RVing, public transport, shipping, mobile housing and modular accommodation spaces, comes an increased need for repair and service of such vehicles and accommodations. The number of trained technicians and service stations available to provide such repairs has not kept up with the demand. Moreover, such repairs typically take several days or more, creating a potential vacation ruining event for the traveler, shipment delays, or loss of accommodations.

Accordingly, improved parking methods and locations that may offer additional amenities for the vehicle and its users are needed.

BRIEF SUMMARY

The systems and methods of the present disclosure solve many of the complications associated with parking a large vehicle, such as a recreational vehicle (RV), bus, truck, and the like, and offer additional amenities that may find use in recreational, commercial, and service locations configured for such vehicles.

Accordingly, the present disclosure provides a parking loop comprising a plurality of parking pads each having a surface configured to support a road-configured vehicle or a road-transportable vehicle ("vehicle"), wherein the plurality of parking pads are generally radially spaced about a central region. Road-configured vehicles generally comprise trucks, RVs, buses, automobiles, modular accommodation spaces, and the like, while road-transportable vehicles generally comprise modular accommodation spaces and the like that are shipped.

The parking loop further includes one or more access roads each positioned between two of the plurality of parking pads and having a distal end terminating at the central region, and a turntable positioned within the central region and comprising an upper surface having a road portion extending across a diameter thereof, wherein the turntable is rotatable to align at least one end of the road portion with the distal end of at least one of the one or more access roads or one of the plurality of parking pads. The turntable may rotate to align the road portion with the access road, allow the vehicle to drive onto the road portion, and may rotate to align the road portion with a selected parking pad so that the vehicle may drive headfirst onto the parking pad or may backup onto the parking pad without the need for turns. Note that the vehicle may be a vehicle transporting a road-transportable vehicle (e.g., truck carrying a modular accommodation space, or the like).

The parking loop may comprise an accommodation area positioned at one or more of the plurality of parking pads. The accommodation area may comprise a ground level portion and optionally a loft portion positioned over the parking pad and configured to not obstruct access of the road-configured vehicle or accommodation to the parking pad. The ground level portion and/or the loft portion may comprise a floor, a ceiling, and walls to provide a substantially enclosed interior space configured for use by human users. The substantially enclosed interior space generally comprises one or more interior spaces or rooms. The interior spaces may be configured for any of a large variety of uses, such as a living space, a dining space, an office space, a workspace, a classroom space, a kitchen space, a bedroom, a bathroom, a medical space, a laboratory space, a retail space, or a combination thereof.

The parking loop may comprise an accommodation area positioned at each of the plurality of parking pads, wherein each of the accommodation areas comprises both the ground level portion and the loft portion; and a community space positioned over the central area and configured to not obstruct access of the road-configured vehicle to the turntable. The community space may comprise a floor, a ceiling, and walls to provide a substantially enclosed interior space configured for access by the human users, wherein the community space is accessible via the loft portion of each of the accommodation areas.

The community space may comprise one or more interior spaces, wherein each of the one or more interior spaces may be configured as a living space, a dining space, an office space, a workspace, a classroom space, a kitchen space, a bedroom, a bathroom, a medical space, a laboratory space, a retail space, an accommodation space comprising a bedroom and bathroom, e.g., such as a hotel room, or any combination thereof.

When included, the loft portions of the accommodation areas may be connected via an outer walkway ring, wherein access to each of the accommodation areas from the walkway ring may be individually controllable.

According to certain aspects, one or more of the plurality of parking pads may include a ground level cooking and eating area.

According to certain aspects, one or more of the plurality of parking pads may be configured to provide maintenance access to an underside of the vehicle.

The turntable of the parking pad may comprise a motor configured to provide rotation of the turntable. The turntable may further comprise a control panel communicatively coupled with the motor and at least one sensor, wherein the at least one sensor communicates a position of one or both of: the turntable relative to the parking pads and the access road, and a position of the vehicle on the turntable, wherein a rotational speed and direction of the turntable is controlled by the motor based on signals receive from the control panel.

The turntable of the parking pad may comprise a circular support mounted by an axle upon a fixed support and rotatable relative thereto in alternate angularly displaced directions, a plurality of wheels or ball bearings radially spaced apart from the fixed support and providing structural support for the circular support, and a motor operatively coupled to the axle or one or more of the plurality of wheels. The turntable may further comprise a control panel communicatively coupled with the motor and at least one sensor, wherein the at least one sensor communicates a position of one or both of: the circular support relative to the parking pads and the access road, and a position of the vehicle on the circular support, wherein a rotational speed and direction of the circular support is controlled by the motor based on signals receive from the control panel.

The present disclosure also provides a system for scheduling an accommodation space, such as within any of the parking loops disclosed herein (i.e., parking pad, ground level portion and/or loft portion of an accommodation area, portion of a community space). The system generally comprises circuitry configured to receive a request for a listing of accommodations available at the parking loop at a user selected date and time frame, wherein the accommodations comprise one or more of a parking pad of the parking loop, an accommodation space of the parking loop, or a portion of a community space of the parking loop; retrieve available accommodation information from one or more servers and generate the listing of accommodations available at the parking loop based on the available accommodation information; display, on a user device, the listing of accommodations available at the parking loop; receive, from the user device, a user selection of at least one of the available accommodations; and generate a reservation based on the user selection.

The accommodations may further comprise one or more modular accommodation spaces positionable on one of the parking pads of the parking loop or in an elevated position above one of the parking pads. The modular accommodation spaces generally comprise a modular frame having a floor, a ceiling, four exterior walls, and one or more separate interior areas, a mobility element configured to allow the modular accommodation space to be moved from a first location or position to a second location or position, a power supply and electrical system, and a control system. The mobility element may allow transport of the modular accommodation space on a road by standard means, such as wheels, or non-standard means, such as maglev, or may allow the modular accommodation space to be transported via another means, such as via a truck, train, or the like (e.g., the mobility elements provide for connection of the modular accommodation space with the other means).

The present disclosure also relates to a system of multi-use building units, the system comprising: a parking loop according to any one of claims 1 to 11; and one or more modular accommodation spaces. The modular accommodation spaces generally comprise a modular frame having a floor, a ceiling, four exterior walls, and one or more separate interior areas, a mobility element configured to allow the modular accommodation space to be moved from a first location or position to a second location or position, a power supply and electrical system, and a control system, wherein the one or more modular accommodation spaces are positionable on one of the parking pads of the parking loop or in an elevated position above one of the parking pads. The control system of the modular accommodation space may direct actions of the mobility element and the electrical system based on user input.

The mobility element of the modular accommodation space may comprise attachment points for connectors configured to allow the modular accommodation space to be lifted to the elevated position over the parking pad; wheels, tracks, magnets, or a combination thereof attached to a bottom surface of the modular frame and configured to allow the modular accommodation space to travel on a flat surface; or a base plate removeably attachable to a bottom surface of the modular frame and configured to allow the modular accommodation space to travel on a flat surface, wherein the base plate comprises one or more wheels, one or more tracks, one or more magnets, or a combination thereof.

The one or more separate interior areas of the one or more modular accommodation spaces comprise any one or more of a living space, a dining space, an office space, a workspace, a classroom space, a kitchen space, a bedroom, a bathroom, a medical space, a laboratory space, a retail space, or any combination thereof.

DESCRIPTION OF THE DRAWINGS

The present invention described herein may be better understood by reference to the accompanying drawing sheets, in which.

DETAILED DESCRIPTION

Figure 1:
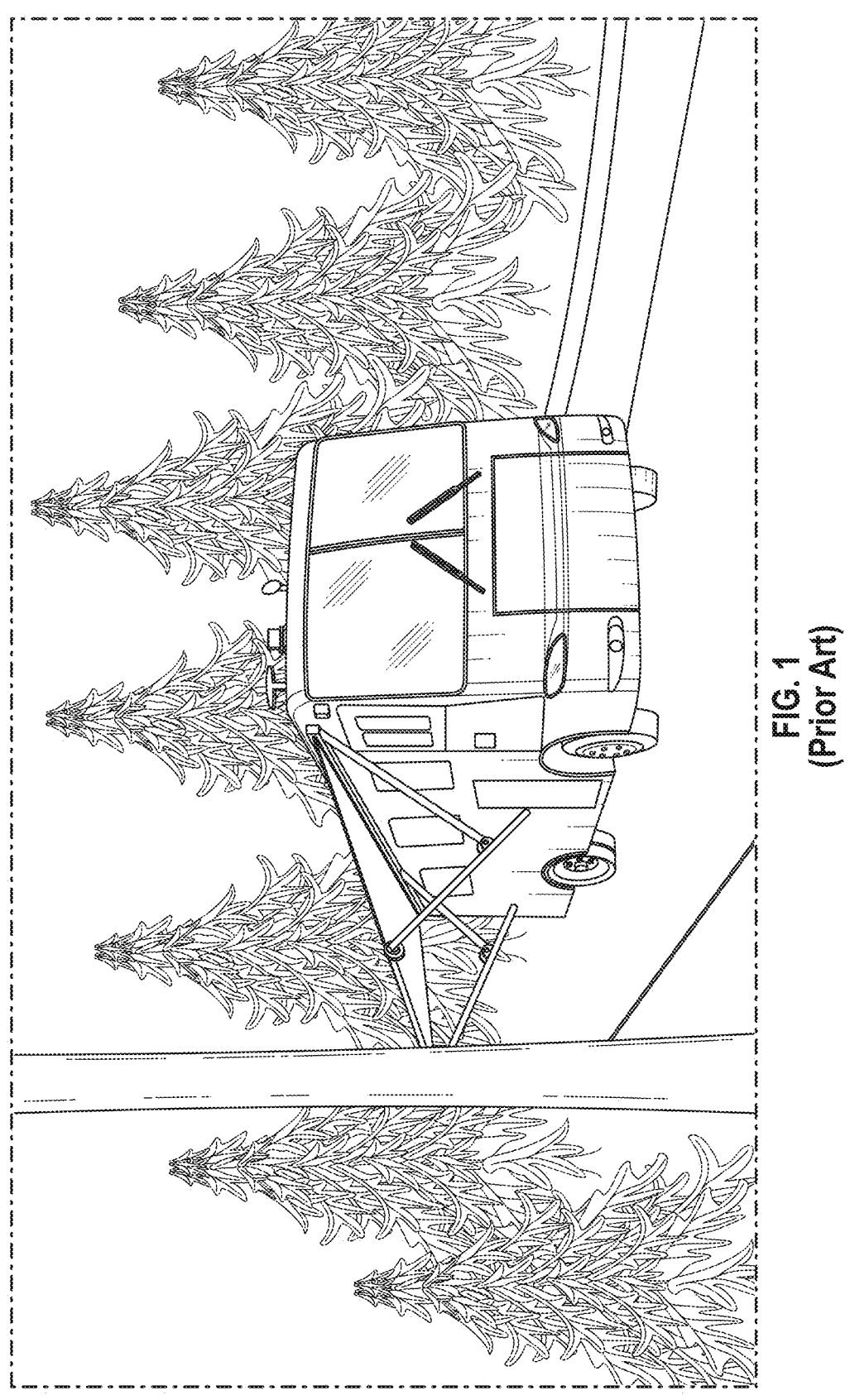
FIG. 1 illustrates a prior art parking location for a recreational vehicle.

In the following description, the present invention is set forth in the context of various alternative embodiments and implementations involving parking locations for road-configured vehicles, such as recreational vehicles (RVs), large trucks, buses, automobiles, modular accommodation spaces and road transportable versions thereof, and the like; systems for providing amenities to such vehicles and spaces; methods for improved access to such parking locations; and methods and software applications that provide reservation and tracking of available parking locations. The embodiments disclosed herein provide a more robust means for parking large vehicles, and improved accommodations useful during extended stays, such as during vacations, vehicle repair, and the like.

Definitions and Abbreviations

Various aspects of the systems and methods disclosed herein may be illustrated with reference to one or more exemplary implementations. As used herein, the term "exemplary" means "serving as an example, instance, or illustration," and should not necessarily be construed as preferred or advantageous over other variations of the systems and methods disclosed herein. "Optional" or "optionally" means that the subsequently described component, event, or circumstance may or may not be included or occur, and the description encompasses instances where the component or event is included and instances where it is not.

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the various parts of the systems disclosed herein may be used unless otherwise indicated.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the terms "include", "includes", and "including" are meant to be non-limiting. As generally used herein, the terms "have", "has", and "having" are meant to be non-limiting.

As used herein, the term "road-configured vehicle" may be understood to include at least automobiles and trucks, large commercial and non-commercial trucks, public transit vehicles (e.g., buses), towed trailers and campers, recreational vehicles, and modular accommodation spaces as described herein. As used herein, the term "recreational vehicle" refers to motor homes, recreational vans, towed travel trailers and campers, and other similar vehicles. Each of these have relatively confined spaces for the occupants to reside in and, due to the nature of their use, are configured to accommodate a number of people, such as couples or families. While certain discussion herein may refer to recreational vehicles, the present disclosure should be understood to be of use with any road-configured vehicle, and reference to one type of vehicle should be considered interchangeable with any other vehicle, unless specifically indicated otherwise.

As used herein, the term "modular accommodation space" may be understood to refer to any transportable space having a modular frame comprising at least one area or room configured or configurable for sleeping, dining, cooking, working, learning, entertaining, relaxing, bathing, e.g., living rooms, dining rooms, kitchens, offices, medical areas (e.g., mobile medical offices), classrooms, bedrooms, bathrooms, and any combination thereof. The at least one area may be configured or configurable for any combination of standard areas, such as any combination of sleeping, dining, cooking, working, entertaining, relaxing, bathing, etc. (e.g., open floor plans, modular and reconfigurable furnishings such as murphy beds, desks, tables, and the like, etc.). These modular accommodation spaces may be mobile, i.e., include some means for movement such as wheels, and/or may be autonomous. Additionally, or alternatively, the modular accommodation spaces may be transportable to a specific location via a crane, lift, on tracks, and the like, as described herein.

Certain of the described methods and/or their equivalents may be implemented with computer executable instructions. Thus, according to aspects of the present disclosure, a non-transitory computer readable/storage medium may be configured with stored computer executable instructions of an algorithm/executable application that, when executed by a machine(s), cause the machine(s) (and/or associated components) to perform the method. Example machines include but are not limited to a processor, a computer, a server operating in a cloud computing system, a server configured in a Software as a Service (SaaS) architecture, a smart phone, and so on. According to certain aspects, a computing device is implemented with one or more executable algorithms that are configured to perform any of the disclosed methods.

Computer readable program instructions as described herein can be downloaded to respective computing/processing devices from a computer readable storage medium or to an external computer or external storage device via a network, for example, the Internet, a local area network, a wide area network and/or a wireless network.

The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). According to certain aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM), qubits, or other memory devices. The memory may store an operating system that controls or allocates resources of a computing device.

A "database", as used herein, may refer to a digitally stored data on the form of a table, a set of digitally stored tables, and a set of data stores (e.g., disks) and/or methods for accessing and/or manipulating those data stores.

Various aspects of the systems and methods disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

As used herein, "communicatively coupled" or a connection by which entities are "operably connected" is one in which signals, physical communications and/or transfers, and/or logical communications may be sent and/or received. Such connections may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wired or wireless network.

A "mobile device", as used herein, may be a computing device typically having a display screen with a user input (e.g., touch, voice, keyboard) and a processor for computing. Mobile devices can include handheld devices, mobile phones, smart phones, laptops, tablets, e-readers, virtual and/or augmented reality devices, and the like.

A "user", as used herein, includes but is not limited to one or more persons, computers or other devices, or combinations of these. In certain instances, the term user may refer to any individual person, computer or other device, interacting with the presently disclosed systems and methods. In other instances, the term user may refer to a specific subset of persons, such as an owner of a vehicle or an owner of a parking loop of the present disclosure.

ASPECTS OF THE DISCLOSURE

Prior art locations for parking a vehicle, such as a recreation vehicle (RV), at a resort or other outdoor recreation location generally include a narrow paved or unpaved area positioned directly adjacent an access road, such as at a 90-degree angle from the access road (see FIG. 1). Even when the parking area is paved and level, parking a larger vehicle in such a spot requires a spotter to signal to the driver when they are getting too close to surrounding obstacles, such as rocks, trees, and other vehicles. No matter how skilled the driver, avoiding these obstacles and making sure their vehicle is straight and completely off the access road is not easy. Moreover, once in the parking spot, there are typically few available amenities and little available privacy.

The present invention provides alternatives to these prior art sites, offering improved amenities, increased ease of parking, higher parking density, and according to certain aspects, systems for additional accommodations and community space.

The Parking Loop

Figure 2B:
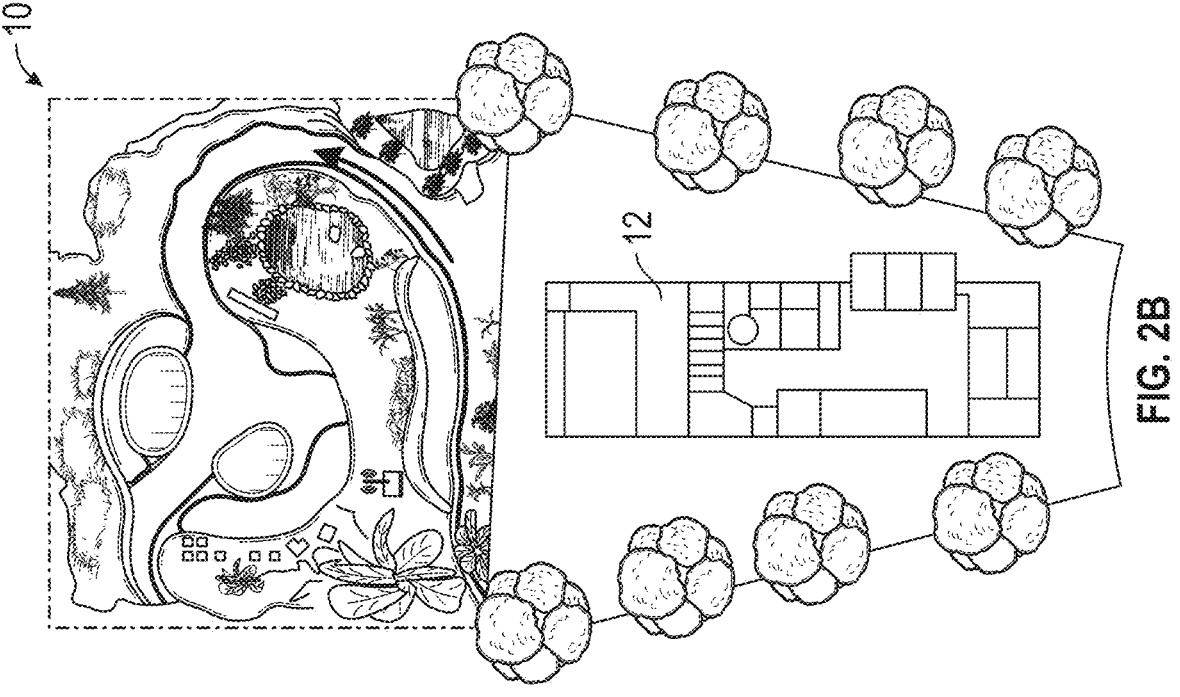
FIG. 2B illustrates a top view of a parking pad comprising the additional amenities area shown in FIG. 2A according to aspects of the present disclosure.
Figure 2A:
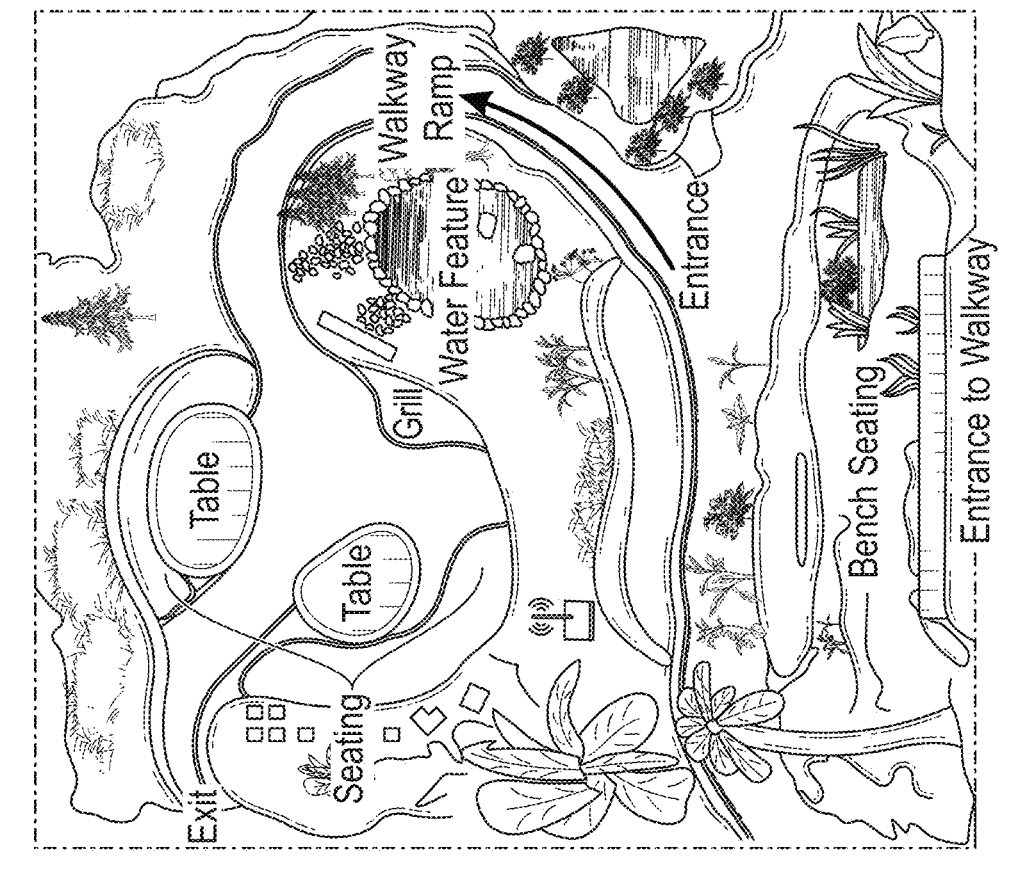
FIG. 2A illustrates a front view and top view of an additional amenities area associated with a parking pad configured for a road enabled vehicle according to aspects of the present disclosure.

With reference to FIGS. 2A and 2B, a personal parking environment is shown that includes a parking pad 14 for a road-configured vehicle 12, such as large truck, bus, or an RV as shown. The parking pad 14 may include an additional amenities area 10, e.g., cooking and eating area, that provides privacy and increased seating capacity over the available capacity of the road-configured vehicle 12 and/or the prior art benches typically found in such locations. For example, the additional amenities area 10 may include benches, one or more tables, a cooking area (e.g., grill, sink, counter area, etc.), a rain and/or wind protection canopy or shelter, entertainment features (e.g., speakers and/or stereo devices, TV or video screen(s), water features), landscaping or planters, privacy screens, and/or other methods to increase the privacy of the site. The additional amenities area 10 may be formed of a lightweight concrete, such as concrete with NewRoad™ additives available from NVI Advanced Materials Group and disclosed in US Patent Application Publication No. 2022/0064065, the content of which are incorporated herein by reference.

Figure 3:
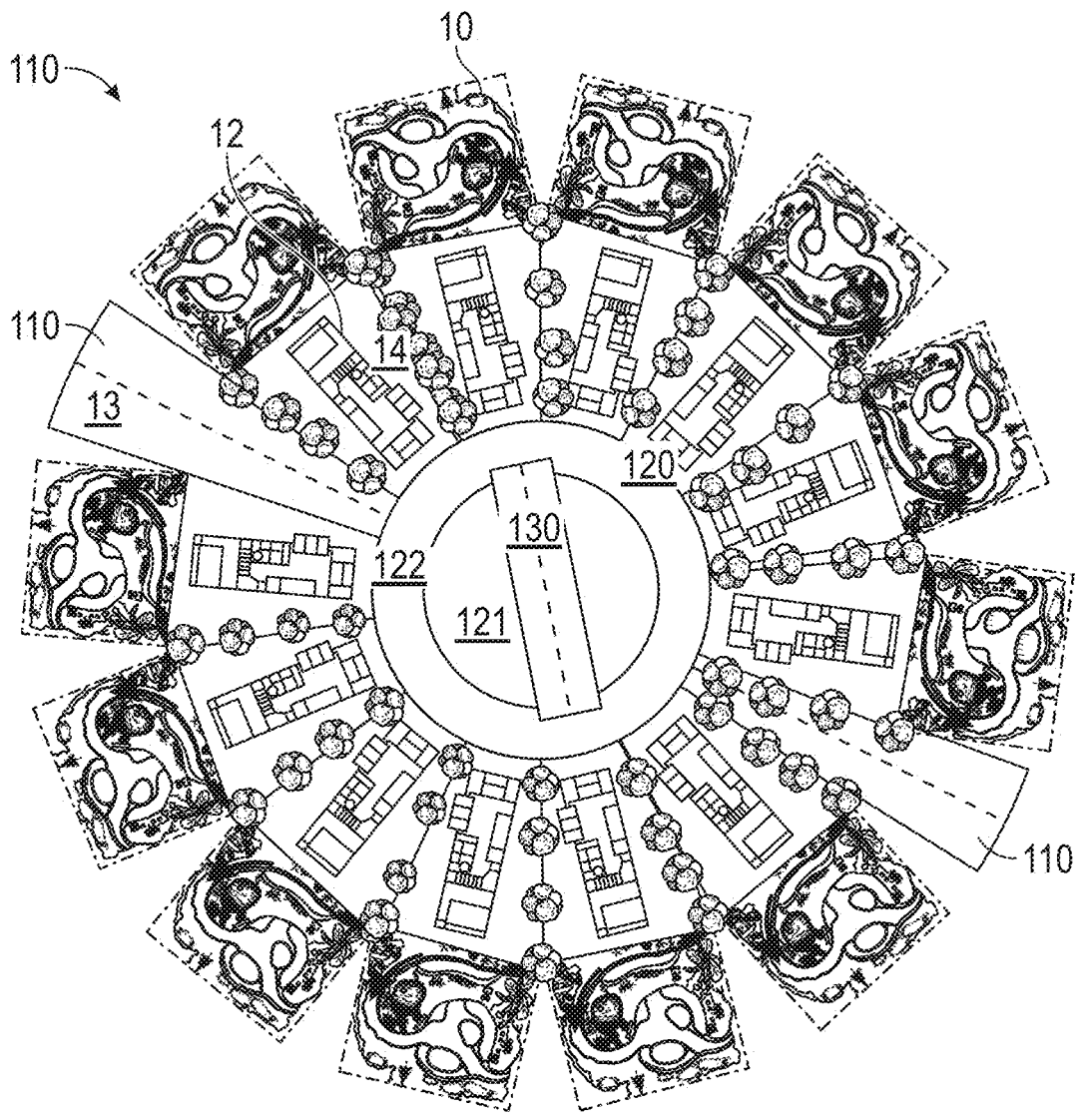
FIG. 3 illustrates an exemplary parking loop providing turntable access to a plurality of parking pads for road enabled vehicles according to aspects of the present disclosure.

With reference to FIG. 3, a parking loop 100 is shown with an RV parked on each available parking pad 14. The loop includes a plurality of parking pads 14 for road-configured vehicles 12 such as RVs arranged in a circle, e.g., radially, about a central region 122. Positioned within the central region 122 is a turntable 120 having a road portion 130 positioned thereon. The road portion is shown to extend across a diameter of the turntable. An access road 110 is positioned between adjacent parking pads 14 and has a distal end that terminates at the central region 122. The parking loop may include a single access road 110, or as shown in FIG. 3, two or more access roads, i.e., shown as providing entry and exit from the left and right of the loop. Further, while each parking pad 14 is shown to include an additional amenities area 10, only certain of the parking pads or none of the parking pads may include an additional amenities area 10.

When the road portion 130 of the turntable 120 is aligned with the access road 110, the road-configured vehicle 12 may enter the loop and park on the turntable. The turntable may then rotate to align the road portion 130 of the turntable 120 with a desired parking pad 14 so that the vehicle 12 may exit the turntable and proceed onto the parking pad (e.g., forward or backward). The vehicle is then properly aligned on the parking pad.

The turntable 120 may generally include a circular platform 121 having the road portion 130 positioned on a top surface, wherein the top surface of the turntable 120 is generally positioned substantially level with the access road 110 and the plurality of parking pads 14. While not preferred, the top surface of the turntable 120 may also be elevated at a level above the access road 110 and/or the parking pads 14.

Any of a number of different mechanisms that provide rotation of the circular platform 121 about a central axis are possible and within the scope of the present disclosure. For example, the circular platform 121 may include a plurality of wheels or ball bearings positioned on a bottom surface, wherein the wheels or ball bearings are radially spaced about a center axis of the turntable. The turntable 120 may further comprise at least one motor configured to drive a corresponding one of the plurality of wheels or a centrally placed axle. When the top surface of the turntable 120 is positioned substantially level with the access road 110 and the plurality of parking pads 14, the plurality of wheels/bearings and at least one motor may be positioned below the level of the access road and parking pads, such as in an underground stationary base (i.e., pit or vault beneath the turntable).

The plurality of wheels or bearings are typically arranged radially on the bottom surface of the circular platform 121, adjacent an outer edge thereof, and may provide not only rotational movement of the turntable, such as axial rotational movement, but also structural support for the circular platform 121. In instances where ball bearings are included, the bearings may be supported on the stationary base in a groove and maintained in position via a corresponding groove on an underside of the circular platform 121. The turntable 120 may also include a central pivot about which the rotation occurs, i.e., a fixed support. In such a case, the central pivot would be positioned in the pit or vault and may provide additional structural support to the turntable.

Thus, according to certain aspects, the turntable mechanism may comprise a fixed support, a circular support mounted by an axle upon the fixed support and rotatable relative thereto in alternate angularly displaced directions, a plurality of wheels or ball bearings radially spaced apart from the fixed support, and a motor coupled to either or both of (i) one or more of the wheels (i.e., direct drive wheels) and (ii) the axle. When the turntable is rotated via a motor and axle, the circular support may include a belt drive mechanism or gears.

While certain methods to drive rotation of the turntable have been disclosed herein, others are possible and within the scope of the present disclosure.

The at least one motor may be communicatively coupled to a control unit 13 for receiving control signals. The control signals may be configured to control a direction of travel and a rotational speed of the turntable. The control signals may also be configured to stop rotation of the turntable at a user-selected position, such as at a preselected position (i.e., aligned with a parking pad or access road) and/or any radial position. The control unit may be a manual control unit positioned at a user accessible location on the road portion 130 of the turntable 120, such as accessible from a driver side window of a vehicle. Alternatively, or additionally, the control unit may be a digital control unit accessible from a software application, such as an application downloadable to a mobile device, an application accessible via the web, or an application run on a server (i.e., desktop computer).

The control unit 13 may receive signals from sensors or switches that indicate a proper alignment of the road portion 130 of the circular platform 121 with a selected parking pad 14 or access road 110. Moreover, the control unit, or a secondary control unit that is also communicatively coupled to the at least one motor, may be configured to receive signals indicative of a position of a vehicle on the circular platform 121. For example, the turntable 120, central area 121, and/or access road 110 may each include sensors, such as IR sensors, pressure switches, and the like, that may detect a position of the vehicle thereon. Movement of the turntable 120 may be limited or prohibited when a vehicle is not properly positioned on the circular platform 121, such as not fully on the circular platform or not aligned on the road portion, even when a user sends a control signal requesting movement of the circular platform 121.

The turntable may further include indicators that are coupled to the control unit 13 and signal to a user, i.e., driver of the vehicle, that the vehicle is properly positioned on the circular platform of the turntable. The indicator means may be a visual signal, such as illuminating different colors, symbols, or words, that are within view of the user.

Accommodation Areas and Community Spaces

Road-configured vehicles typically do not provide space for sleeping, eating, and other daily functions, or provide only limited space for such functions, e.g., buses may provide bathrooms, commercial trucks may provide small sleeping areas, and RVs may provide cramped sleeping, eating, and bathing areas. Should a traveler desire accommodation, or a larger number of people traveling in an RV desire accommodation, or should the traveler want to meet with additional travelers, access to additional space for such functions would be advantageous.

According to certain aspects of the present disclosure, an accommodation area 200 may be positioned on the parking pad 14, such as at an end of the parking pad distal from the turntable 120. The accommodation area 200 generally comprises a floor, a ceiling, and walls to provide a substantially enclosed interior space configured for use by human users.

Figure 4:
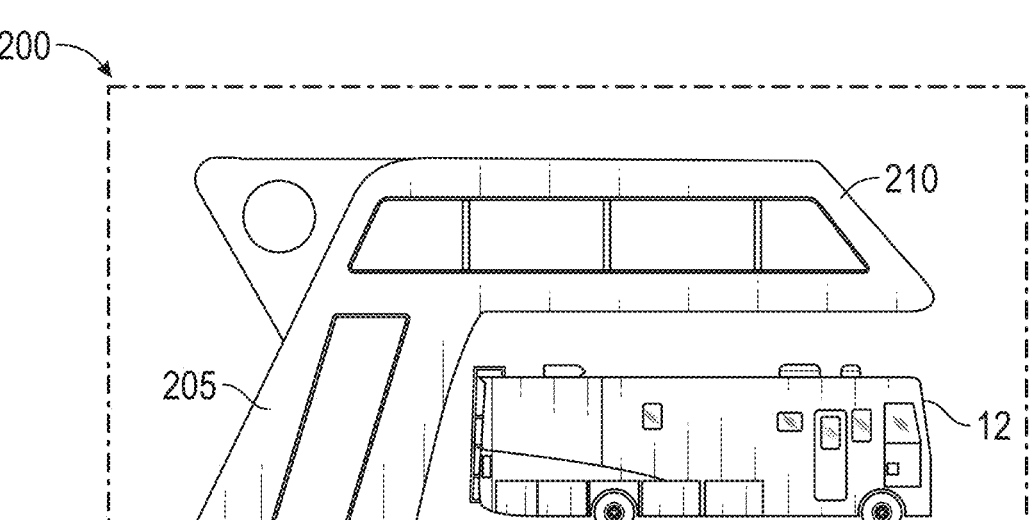
FIG. 4 illustrates an accommodation area associated with a parking pad of the parking loop of the present disclosure, wherein a recreational vehicle is parked in the parking pad.

As shown in FIG. 4, the accommodation area 200 may include a main region 205 and, according to certain aspects, a loft portion 210 suspended over the parking pad. The main region 205 and/or loft portion 210 may be configured to provide additional space while allowing a vehicle 12 to be parked underneath on the parking pad 14. The accommodation area 200 may include a porch or deck, such as extending from a side of the main region 205 and/or loft portion 210, or on a top side of the main region 205 and/or loft portion 210 (e.g., roof). As shown in FIG. 4, the loft portion 210 also provides additional shade and weather protection for a vehicle parked beneath on the parking pad 14.

Figure 5:
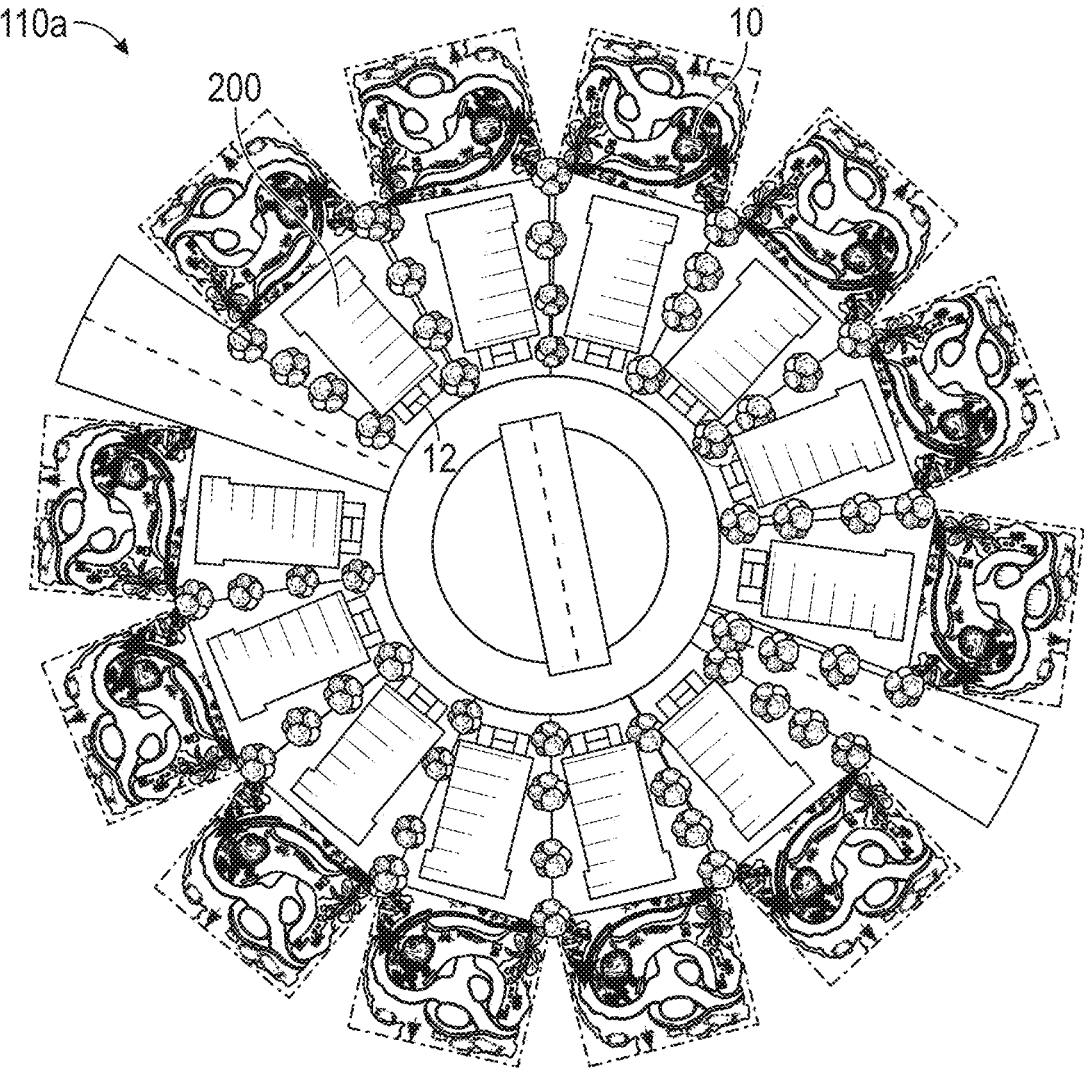
FIG. 5 illustrates an exemplary parking loop, wherein each parking pad within the parking loop includes an accommodation area as shown in FIG. 4.

As shown in FIG. 5, the parking loop 100*a* may include an accommodation area 200 positioned at every parking pad 14. Alternatively, only some or none of the parking pads 14 may include the accommodation area 200. Further, the accommodations area 200 may include the main region 205 and some or all may further include the loft portion 210. FIG. 5 illustrates a parking loop having an accommodation area with both the main region 205 and loft portion 210 at each parking pad 14.

Figure 6:
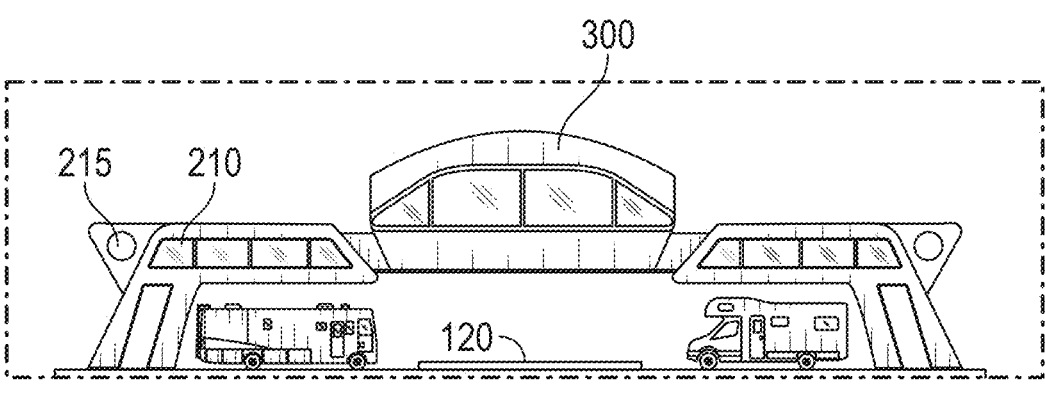
FIG. 6 illustrates a community space positioned centrally between accommodation areas according to aspects of the present disclosure.
Figure 7:
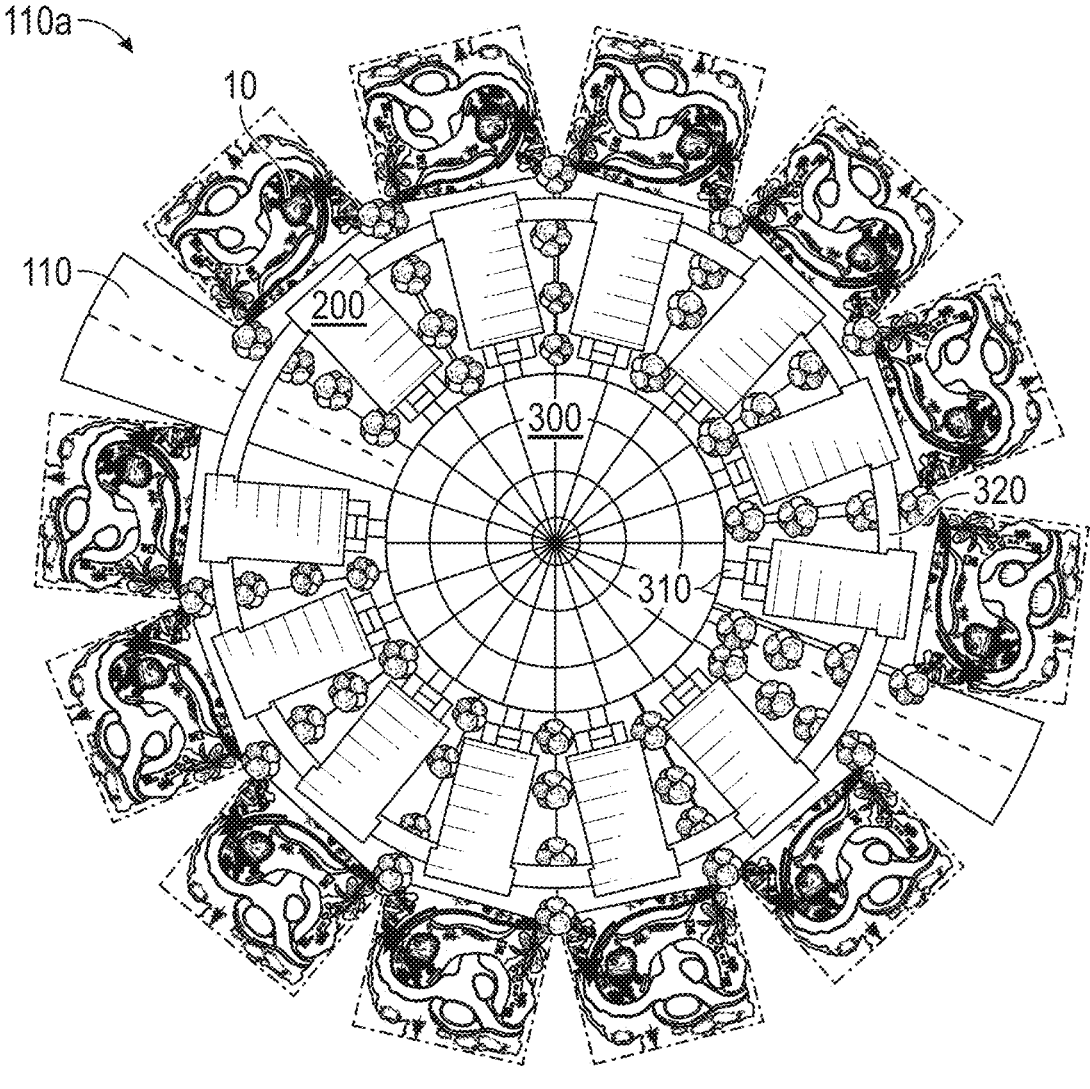
FIG. 7 illustrates an exemplary parking loop, wherein each parking pad within the parking loop includes an accommodation area and access to the community space shown in FIG. 6.

To provide yet more additional space, the parking loop 100*b* may also include a community space 300. The community space 300 generally comprises a floor, a ceiling, and walls to provide a substantially enclosed interior space configured for access by the human users. As shown in FIG. 6, the community space 300 may be accessible from individual accommodation areas 200 and may be positioned over the turntable 120. With reference to FIG. 7, the community space of the parking loop 100*b* is shown to be centrally located so that each accommodation area 200 may provide/gain access to the community space 300 via a portal 310 (e.g., door and hallway or walkway). Access from an accommodation area 200 to the community space 300 may be controlled (e.g., door locks and keys, biometric access, and the like), or may be free flowing.

Moreover, each accommodation area 200 may be configured to access adjacent accommodation areas, such as by access along an outer ring 320 (e.g., pathways, hallways, doors, etc.). Access from one accommodation area 200 to another may include controlled admittance between the accommodation areas 200, much as double doors in adjoining hotel rooms. As such, adjacent accommodation areas 200 may decide to allow entry therebetween to share space, such as may be done with groups traveling together. Alternatively, or additionally, the outer ring 320 may be positioned along a rearmost portion 215 of the accommodation area 200 so that free passage around the outer ring 320 is available while maintaining controlled access to individual accommodation areas 200. Entry to individual accommodation areas 200 from the outer ring 320, another accommodation area, or the community space 300 may be via a controlled access such as a door (e.g., access controlled by lock and key or biometric screening such as a camera, eye scanner, fingerprint scanner, voice recognition, etc.).

The accommodation area 200 may include or provide residential spaces (e.g., bedrooms, bathrooms, kitchens, dens, etc.), commercial spaces (e.g., offices, retail, entertainment, childcare, fitness center, healthcare, food service, etc.), or any combinations thereof (e.g., inter- or intra-accommodation area combinations).

The community space 300 may include or provide a variety of uses, such as a conference center, fitness center, dining and/or bar area, day care, spa and wellness center, concierge level, theater and entertainment area, event area, quiet personal space, trip planning and logistics center, vehicle maintenance and care center, additional accommodation areas (e.g., hotel rooms), etc. For example, at a resort, the community space may be configured to provide additional entertainment or conference areas, a concierge, a restaurant, shops, a spa, a day care, etc., wherein the types of shops and amenities are tailored for a vacation traveler. As further example, the parking loop may be configured as a truck or bus stop, and the community space may provide an entertainment area, restaurant, and/or retail shop, wherein the types of shops are tailored for the truck drivers or bus passengers.

The parking loops disclosed thus far have been described as configured to provide parking space for large road-configured vehicles, such as RVs, buses, large trucks, and the like. When configured for high-density residential or commercial use, all or some of the parking pads may be configured for standard automobiles and trucks, such as to provide parking spaces beneath the loft portion of the accommodation area. In such cases, the accommodation areas may be configured as individual residential spaces (home, apartment, condominium), office spaces (medical, business, etc.), hotel spaces, or combinations thereof.

Other uses envisioned for the presently disclosed parking loop include a way point to provide vehicle maintenance and repair. As such, portions of the parking pad 14 may be configured to allow access to the underside of the vehicle, such as in a service bay of a repair shop (e.g., pit beneath the vehicle or lift to raise the vehicle), and/or may provide co-location of tools and other repair equipment. As repairs to a vehicle may take several days or more, the accommodation areas 200 may be configured to provide lodging and other amenities for vehicle occupants while the vehicle in under repair. Even in cases where the vehicle could provide lodging, such as an RV or long-haul truck cab, repairs typically disrupt the normal functions of such a vehicle. Moreover, when a community space is included in the parking loop, it may provide additional amenities and entertainment opportunities tailored for the for the vehicle occupants during their stay (e.g., services related to trip planning and logistics, restaurants, theaters, gaming areas, etc.). Thus, a traveler or trucker would find such a location to be highly desirable, providing accommodation and even entertainment opportunities during a repair visit.

The presently disclosed parking loops may also find use for long duration stays. In such as use, the community space 300 may include one or more amenities useful for such stays, i.e., salon and/or barber, restaurant, shops, etc. When configured for long duration stays, the accommodation areas 200 may also include amenities useful for such stays, i.e., kitchens, offices, bathrooms, etc.

Figure 8:
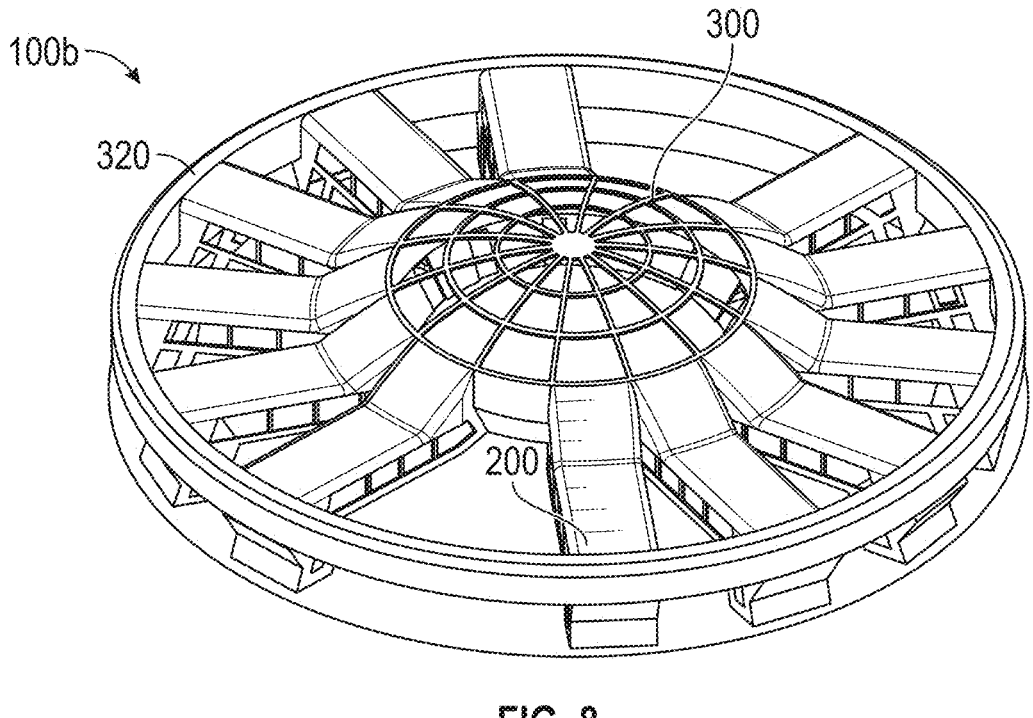
FIG. 8 illustrates a three-dimensional rendering of the accommodation areas and community space shown in FIG. 7.
Figure 9:
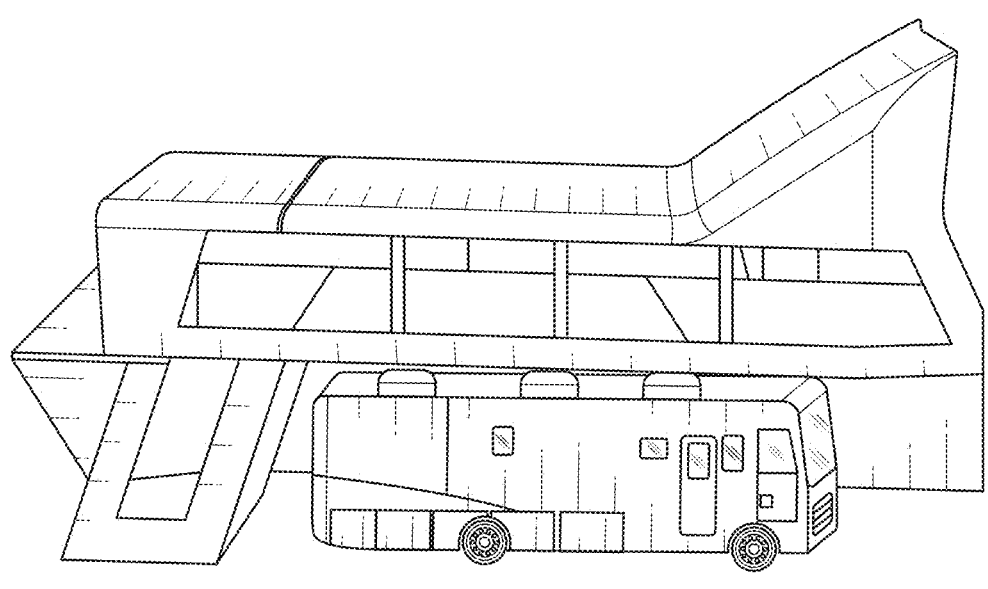
FIG. 9 illustrates a three-dimensional rendering of a recreational vehicle parked under a loft portion of an accommodation area according to aspects of the present disclosure.

A three-dimensional (3D) model of an exemplary parking loop 100*b* is shown in FIG. 8. The individual accommodation areas 200 are shown to be attached to the central community space 300 and include an outer access ring 320. Shown in FIG. 9 is a 3D model of an accommodation area 200 with an RV parked underneath. Each of the accommodation areas 200 and/or the community space 300 may be prefabricated and transported to the building site/location via standard transport means, e.g., flat-bad trucks. Exemplary materials useful for construction of the parking loop (parking pad 14, accommodation area 200, and central community space 300) may include lightweight concrete, such as concrete with NewRoad™ additives available from NVI Advanced Materials Group and disclosed in US Patent Application Publication No. 2022/0064065, the content of which are incorporated herein by reference.

Figure 10:
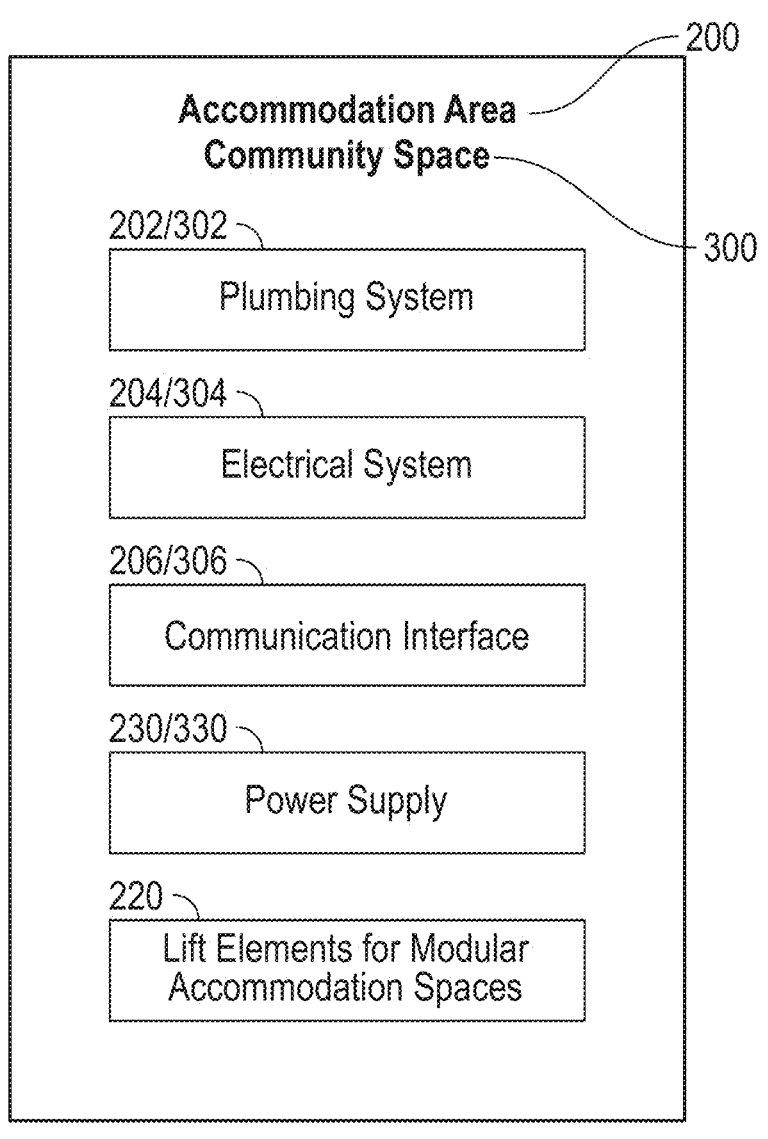
FIG. 10 is a block diagram illustrating portions of the accommodation areas and community spaces according to aspects of the present disclosure

With reference to FIG. 10, the accommodation area 200 and central community space 300 may include one or more standard appliances (e.g., computers, surveillance cameras, lighting, air conditioning units, heating units, air filters, humidifier, dehumidifier, etc.) and one or more appliances specific to the use of the area or space. Each of these appliances may be powered via an electrical system (204, 304) coupled to external power, or coupled with a power supply (230, 330) provided in each of the accommodation areas and/or the community space, such as a power supply that may include one or more rechargeable batteries or an alternate fuel source. The rechargeable batteries may be charged by connection to an energy generator that is part of the power supply, such as solar panels, a wind turbine, and the like.

The accommodation area 200 and central community space 300 may include a plumbing system (202, 302), which can consist of one or more plumbing fixtures, e.g., water tanks, water heaters, septic tanks, pipes, water pumps, sinks, faucets, showers, etc. The plumbing system may be connected to external supply (i.e., community water pipes and sewer system) or may use local sources such as a well and septic system. As will be discussed in more detail below, the plumbing system (202, 302) may also be configured to provide water and sewage connections for external units, such as the vehicles parked on the parking pads 14 (e.g., RVs, modular accommodations spaces, and the like) or elevated to a position above the parking pads (e.g., modular accommodation spaces).

The accommodation area 200 and central community space 300 may collectively or individually include a communication interface (206, 306), which can comprise wireless and/or wired connection to external sources, e.g., the internet, a satellite, global positioning devices or services, cable connections and the like. Various cameras, sensors, and other surveillance equipment may be included and configured as part of the communication system such that environmental conditions inside and outside of various regions of the parking loop may be monitored, e.g., temperature and humidity, possible fire or flooding, and/or activity inside and outside of the parking loop structures may monitored both locally and remotely. Local monitoring may be via a control panel located within individual accommodation areas 200 and/or the central community space 300, or via a downloadable application or web application running on a cell phone or computer.

Figure 12:
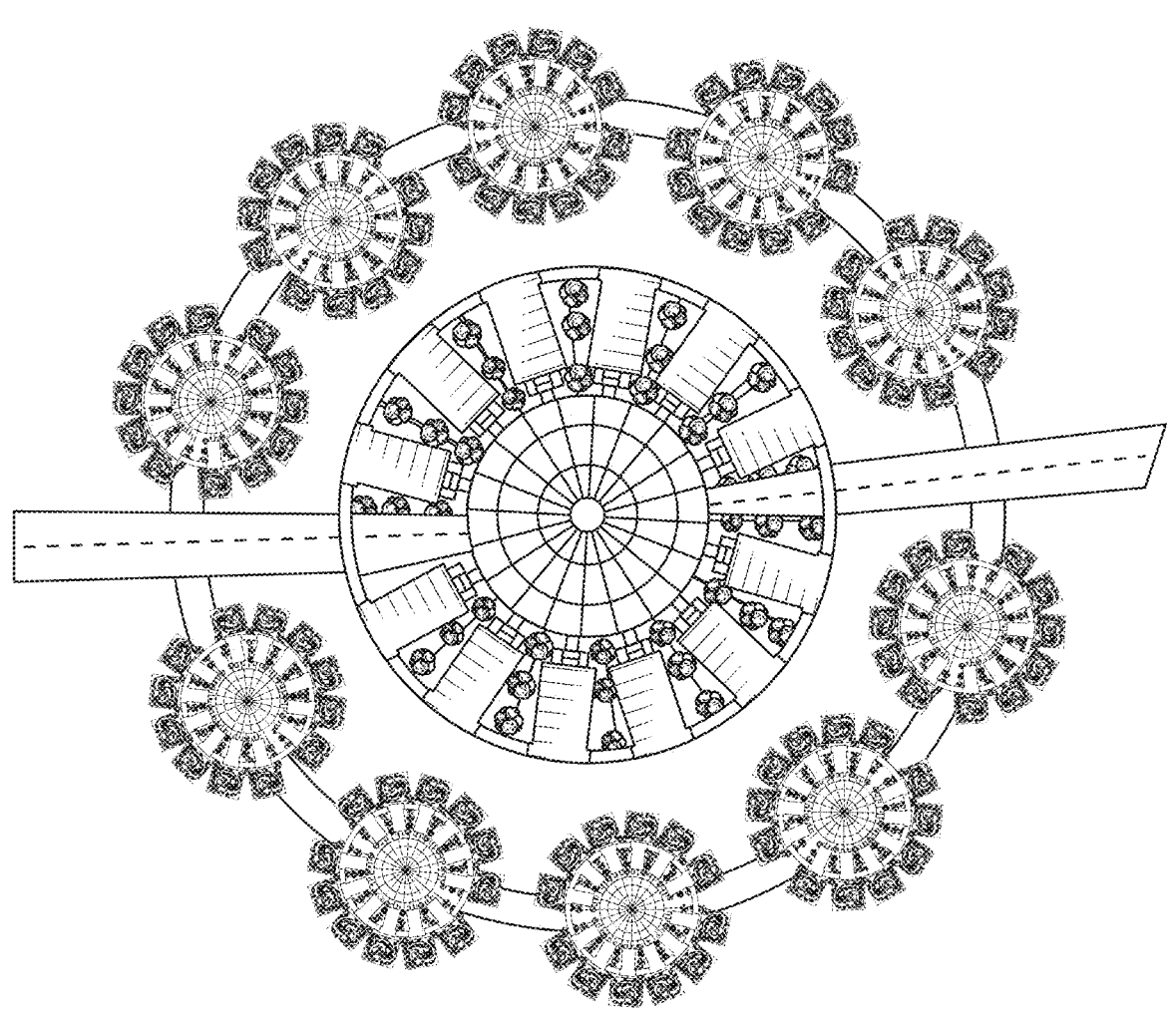
FIGS. 12 and 13 illustrate various configurations for a plurality of parking loops according to aspects of the present disclosure
Figure 13:
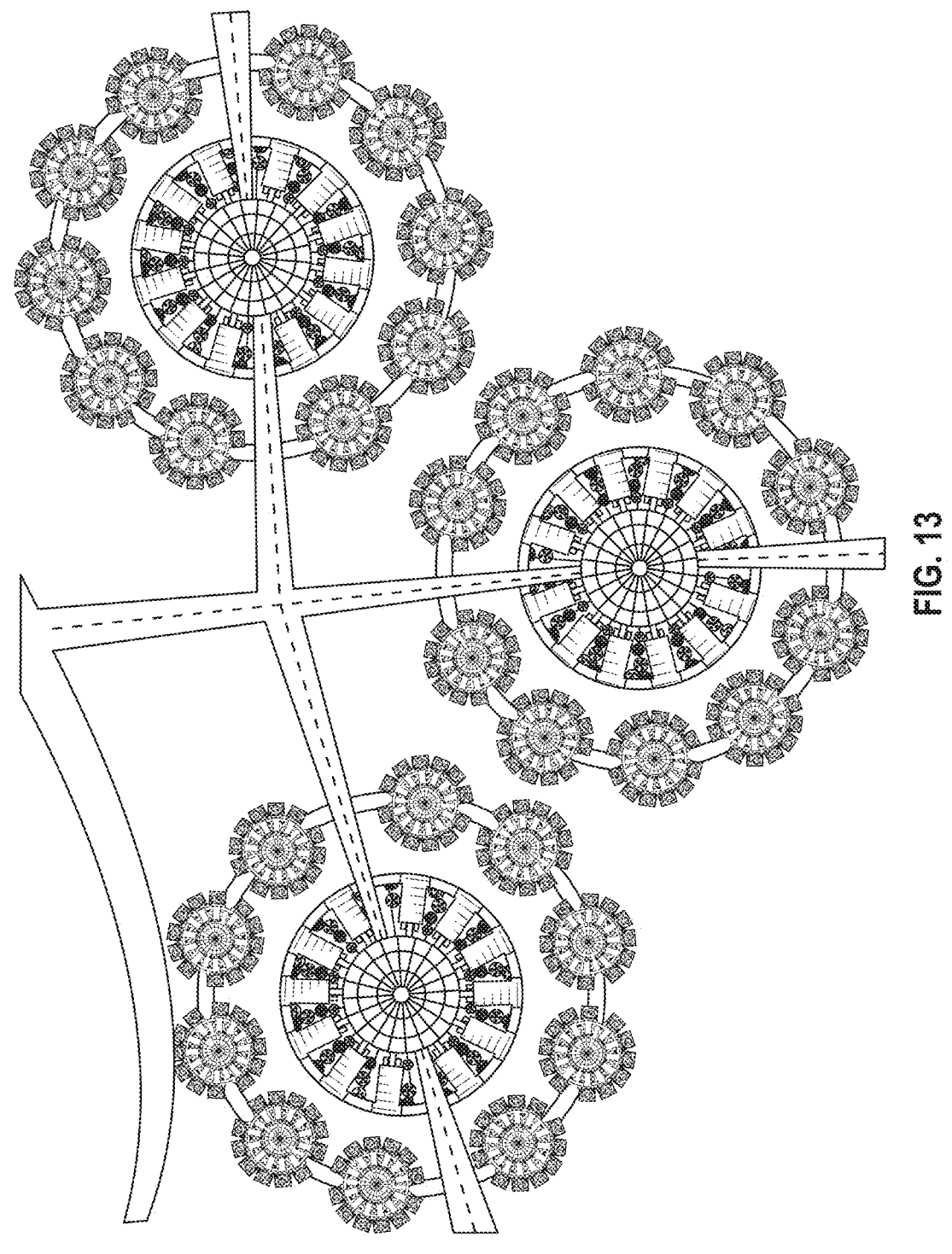

FIG. 12 illustrates groups of parking loops arranged about a central parking loop, and FIG. 13 shows several of these larger configurations grouped adjacent to one another. Such groupings of parking loops could be provided as resorts, theme parks, truck/RV/automotive etc. dealerships with "service as a destination", shopping/entertainment centers, manufacturing plants/business offices etc. centers, high-density residential complexes, or any combination thereof. As such, individual community spaces may be accessible from each of the loft portions of the accommodation areas, and optionally, from one or more external access points. Moreover, each of the community spaces may provide unique amenities so that the larger community may have access to a broader range of amenities.

The parking loops disclosed thus far have been described as configured to provide parking space for large road-configured vehicles, such as RVs, buses, large trucks, cars, and the like. When configured for high-density residential or commercial use, all or some of the parking pads may be configured for standard automobiles and trucks, such as to provide parking spaces beneath the loft portion of the accommodation area. According to certain aspects, some of the parking pads may be configured for larger vehicles to provide parking for those vehicles (e.g., RVs) and/or deliveries (e.g., via trucks).

The parking loops may also provide parking and/or docking for novel modular accommodation spaces that may be road-configured or may be transported to the parking loop via truck or rail. For example, a modular accommodation space may be towed by a truck and delivered to a parking pad or may be hauled on a flatbed and delivered to a parking pad.

According to certain aspects, the accommodation area 200 of the parking loop may include lift elements 220 at the parking pad 14 that may elevate a modular accommodation space to a position over the parking pad, i.e., to a position substantially the same as the loft portions 210 shown in FIGS. 4 and 6. In this latter case, the loft portion 210 of the accommodation area may comprise a frame or support elements configured to support the modular accommodation space in an elevated position (i.e., may not include structure configured to provide interior spaces) or may include the structure configured to provide interior spaces as shown in FIGS. 4 and 6, wherein the support elements may be positioned on a top of the structure (i.e., on a roof of the loft portion). The lift elements 220 may remain elevated to maintain the modular accommodation space in the elevated position, i.e. the lift elements may act as support elements, e.g., as a car lift in a repair garage or a four post lift often found for parking a vehicle. Alternatively, the lift elements 220 may elevate to position the modular accommodation space the elevated position, and may then retract to leave the modular accommodation space on a support frame (e.g., once elevated to a position adjacent and slightly above the frame, portions of the frame may move to become aligned with and supportive of a base of the modular accommodation space). Other means for positioning the modular accommodation space in an elevated position are possible and within the scope of the present disclosure.

Modular Accommodation Spaces

Prior art accommodations such as hotels, motels, and cabins at a resort are positioned in a fixed location within the resort and are not personalized as they are configured to be used by a range of individuals. The traveler must pack and bring all of their own essentials, e.g., clothes, toiletries, and personal items. Similar issues exist for office and workspaces, wherein a change in office locations generally means packing up the contents of one office for use in the new office location.

The modular accommodation spaces disclosed herein offer solutions to these problems by providing spaces that may be positioned and repositioned to gain access to a user selected location. The modular accommodation spaces may be shipped to a user selected location or, for short distances, may autonomously navigate or be controlled remotely or manually to advance to the user selected location. Moreover, according to certain aspects, the accommodation spaces may be positionable in a group, such as stacked for storage, racked to become part of a larger structure, such as a hotel, office park or building, apartment building, or the like. Accordingly, the modular accommodation spaces may be positionable in a large range of locations, such as personal residential or vacation locations, commercial locations, non-profit locations (e.g., government, schools or universities, hospitals, Red Cross, etc.), and within defined spots in the presently disclosed parking loops, such as a parking pad in the parking loop or in a position elevated over the parking pad as disclosed hereinabove.

Figure 11:
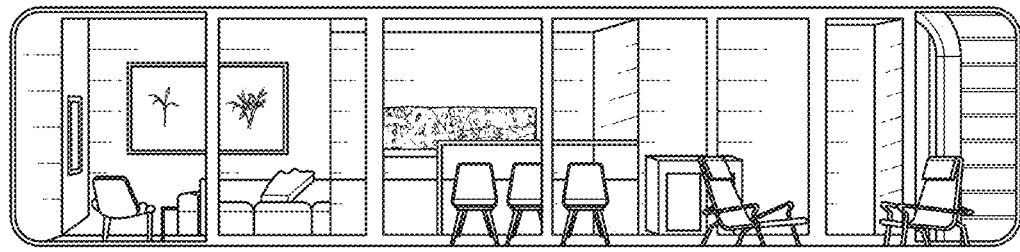
FIG. 11 illustrates a modular accommodation space according to aspects of the present disclosure.

Modular accommodation spaces according to the present disclosure are compact, self-contained mobile units, i.e., self-propelled or assisted, that provide additional living, working, learning, etc. space. Modular accommodation spaces generally include a modular frame comprising a floor, a ceiling, four exterior walls, and one or more separate interior areas. The one or more interior areas or rooms may be configured or configurable for any of a large range of uses, i.e., sleeping, dining, cooking, working, learning, entertaining, relaxing, bathing, and the like. Exemplary uses include any of those described hereinabove for the accommodation areas 200 and/or community spaces 300, such as living rooms, dining rooms, kitchens, offices, medical areas (e.g., mobile medical offices), classrooms, bedrooms, bathrooms, laboratory or testing facilities, spa facilities, retail areas, and so forth. The at least one area may be configured or configurable for any combination of these areas or uses, such as any combination of sleeping, dining, cooking, working, entertaining, relaxing, bathing, etc. (e.g., open floor plans, modular and reconfigurable furnishings such as murphy beds, desks, tables, and the like, etc.). An exemplary modular accommodation space is illustrated in FIG. 11.

Accordingly, each modular accommodation space or grouping thereof may be configured to serve a variety of purposes. For example, the modular accommodation spaces may serve as a primary residence, e.g., tiny home; as a portion of a residence, e.g., an auxiliary dwelling unit such as guest house or in-law apartment; as an additional room at a commercial or residential building, such as a bedroom, bathroom, nursing area, play area, ballroom for large gatherings, and the like; as an apartment; as a residential office space, such as a single office that may be positioned at a user's home location or within a predefined resort location; as a commercial office space, such as positionable at a commercial location to expand or define a new work area; as a residential or commercial service location (e.g., spa, salon, etc.), as a portable rest room, etc.

Figure 14:
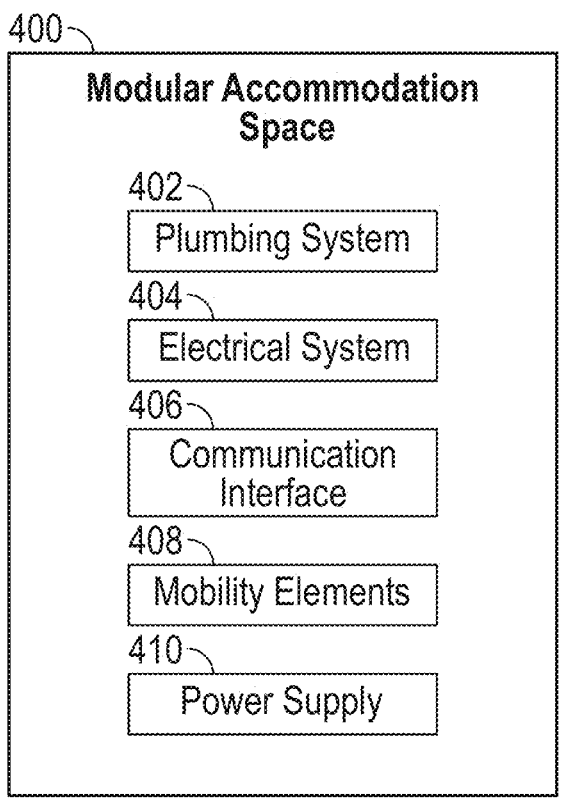
FIG. 14 is a block diagram illustrating portions of the modular accommodation spaces according to aspects of the present disclosure.
Figure 15:
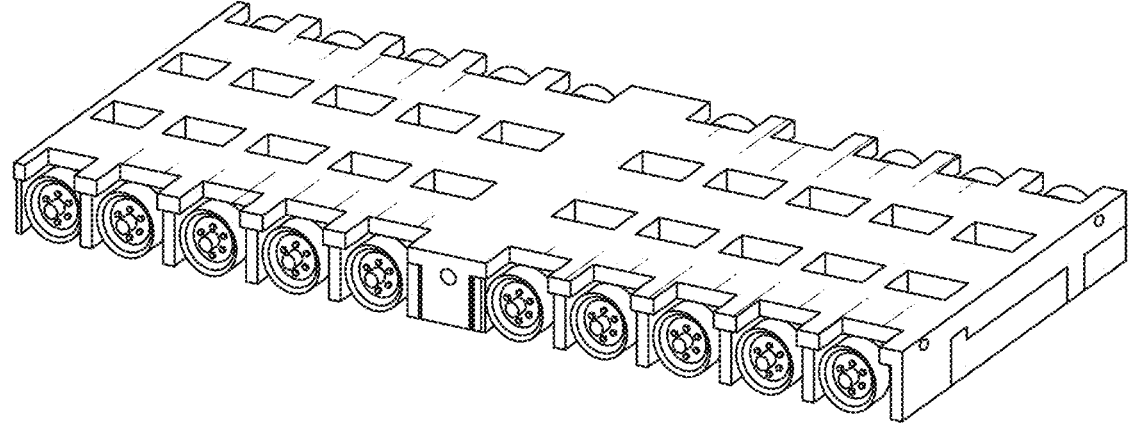
FIG. 15 illustrates a wheel system useful for the modular accommodation spaces according to aspects of the present disclosure.

With reference to FIG. 14, the modular accommodation space 400 may include mobility elements 408 rendering it moveable and/or mobile. The mobility elements 408 may be integrated with the modular accommodation space (i.e., as part of a chassis or unibody, or as integral power) or may be included as part of a base, such as shown in FIG. 15. The mobility elements 408 or a base comprising the mobility elements 408 may be positioned or positionable on or adjacent to a bottom surface of the modular accommodation space. While illustrated in FIG. 15 as a base including a plurality of wheels in rows along longitudinal sides thereof, the mobility elements on such a base may additionally or alternatively comprise four individual wheels, several rows of wheels, or several tracks. Moreover, any of the mobility elements 408, i.e., those positioned on the mobile accommodation space or on a base, may include elements useful for alternative transportation means, such as magnetic levitation or maglev (e.g., sets of magnets).

The mobility elements of the modular accommodation space may be powered by standard means, such as one or more of standard liquid gas engines (gas, diesel), natural gas engines, electric motors (i.e., linked to batteries powered by solar or electrical charging and the like), or hybrid gas and electric engines or motors. The mobility elements of the modular accommodation space may be powered by alternate means, such as hydrogen motors, in-road electromagnetic drive (i.e., electric motors), MagLev, magnetic drive, and the like. For electric powered motors, charging may be via self-charging from the road or a docked position, power and/or charging from a docked or racked position, powered via solar panels, etc. While specific examples of powering the mobility elements have been listed, others are possible and within the scope of the present invention.

The modular accommodation space may be configured to be pulled by a truck or on rails. Alternatively, or additionally, the modular accommodation space may be configured to be transported from one location to another, such as on a flatbed of a truck or train, or on a ship, etc. The modular accommodation space may be configured to be transported from one location to another via a crane or elevator mechanism. In such a case, the mobility elements 408 may alternatively or additionally comprise rigging points on the modular accommodation space that provide connection for rigging that allow the modular accommodation space to be lifted and/or pulled onto a truck, rail car, ship, and/or into position when stacked or placed into a grouping (i.e., racked), such as to an elevated position in a parking loop, as described hereinabove.

When lifted by a lift mechanism (e.g., lift elements 220 such as an elevator, crane, etc.) to be positioned into a larger structure such as elevated over a parking pad 14, the wheels, tracks, or other mobility elements used for movement of the modular accommodation space on a flat surface may also allow for final positioning and alignment of the modular accommodation space over a parking pad. Alternatively, the modular accommodation space may include integrated rails or other attachment elements that may be operably connected to comparable attachment elements on the larger structure, i.e., such as the elevated position over a parking pad, and may provide for final and proper positioning thereon.

While specific examples of mobility elements have been disclosed, other means known in the art are also possible and within the scope of the present disclosure.

When included in a parking loop, the modular accommodation space may provide access to common spaces within the larger structure and/or to other modular accommodation spaces positioned in the structure in a manner similar to those described hereinabove for the loft portion of the accommodation areas. For example, various portions of the modular accommodation space may be alignable with specific access regions to either or both of the accommodation area 200 (e.g., via the main region 205 or the access ring 320) and the community space 300 (e.g., directly or via the portal 310), such as doors on the modular accommodation space that align with and provide access to these regions.

Connectivity for plumbing, electricity, security and safety elements (i.e., fire alarms, security cameras, etc.), and/or computer communication may be provided to the modular accommodation space when included in the parking loop. Such connectivity may be afforded manually or automatically, i.e., auto-dock or auto-connect to all or certain services.

With continued reference to FIG. 14, the modular accommodation space may include one or more appliances (e.g., computer, doorbell and surveillance cameras, lighting, air conditioning units, heating units, air filters, humidifier, dehumidifier, etc.) that can be powered by a power supply. Additional appliances specific to the use of the modular accommodation space may also be included. The power supply 410 may include one or more rechargeable batteries or an alternate fuel source. The rechargeable batteries may be charged by connection to an energy generator that is part of the modular accommodation space, such as a liquid or natural gas engine, hydrogen motors, solar panels, and the like, and/or by an external source, e.g., fueling or recharging station, in-road electromagnetic source, and the like. When docked as part of a parking loop, the external source of power may be provided by power sources specific to the parking loop, i.e., connected to commercial power via an electrical system that is part of the parking loop or connected to power sources unique to the parking loop such as wind or solar power, wireless charging, and the like.

The power supply 410 may be operatively coupled to various portions of the modular accommodation space to provide electricity for lighting, wireless communication, computers, televisions, water heating, sensors and cameras, and/or cooking, and to provide power for a user's appliances (i.e., outlets). In some instances, cooking units and/or a water heater may additionally or alternatively be fueled by natural gas or any other gas or energy source known in the art (e.g., propane).

The modular accommodation space 400 may include an electrical system 404, which generally comprises wiring and outlets configured to provide connectivity for the various appliances and/or control systems to the power supply 410 or system.

When the power supply 410 comprises a rechargeable battery or batteries, such may have a battery level sensor that outputs a signal indicative of a charge level of the rechargeable battery. For example, should the rechargeable battery or batteries have a low level of charge (e.g., less than 10%, less than 5%, less than 3%, or less than 1%), the modular accommodation space may output a warning (e.g., audible or visual, such as on a display within the modular accommodation space, etc.) indicating that the rechargeable battery needs to be charged. According to certain aspects, when the battery level is low, the modular accommodation space may move to a docked position automatically, such as auto-dock with an electricity supply of the parking loop.

The modular accommodation space 400 may include a plumbing system 402, which can consist of one or more plumbing fixtures, e.g., water tanks, water heaters, septic tanks, pipes, water pumps, sinks, faucets, showers, etc. In some examples, the plumbing system can be maintained by operatively connecting to, for example, a water supply and/or a sewage dump external to the modular accommodation space, such as provided by the parking loop disclosed herein.

The modular accommodation space 400 may include a communication interface 406, which can comprise wireless and/or wired connection to external sources, e.g., the internet, a satellite, global positioning devices or services, cable connections and the like. The modular accommodation space may comprise various cameras, sensors, and other surveillance equipment configured as part of the communication system such that environmental conditions inside and outside of the modular accommodation space, e.g., temperature and humidity, possible fire or flooding, and/or activity inside and outside of the modular accommodation space may monitored both locally and remotely. Local monitoring may be via a control panel located within the modular accommodation space, via a downloadable application or web application running on a computer within the modular accommodation space, or via a downloadable application or web application running on a cell phone or computer exterior or distant from the modular accommodation space.

The modular accommodation space 400 may also include a biometrics capturing device. The biometrics capturing device can be, e.g., a camera, an eye scanner, a fingerprint scanner, voice recognition, etc., that communicates with the communication interface 406. The biometrics capturing device can be used to collect biometrics information from a person attempting to access the modular accommodation space 400. Captured biometrics information can be cross-referenced against stored biometrics information from owners of the modular accommodation space and/or tenants to verify their identity when seeking to enter the modular accommodation space 400. The stored biometrics data may be stored locally on the modular accommodation space, such as on a memory of the control unit 510, and/or remotely, such as on an external server 514 (see FIG. 16).

Autonomous Modular Accommodation Spaces

The modular accommodation space may be configured to be autonomous. That is, the modular accommodation space may transport itself with little or no human intervention. As such, the mobility elements 408 may be connected to a power system and other standard components (e.g., drive train, axels, etc.) or non-standard components (e.g., magnets for MagLev) that provide motion of the mobility elements 408.

Movement of the modular accommodation space may be powered by the power system 410 as described hereinabove, i.e., standard liquid gas engines (gas, diesel), natural gas engines, electric motors (i.e., linked to rechargeable batteries powered by solar or electrical charging and the like), hybrid gas and electric engines or motors, hydrogen motors, in-road electromagnetic drive (i.e., electric motors), MagLev, magnetic drive, and the like. Movement of the modular accommodation space may be powered by rechargeable batteries powered by any of the above indicated engines or motors, solar power, in-road electromagnetic drive, and the like. According to certain aspects, the mobility elements 408 are direct drive wheels that use electricity from rechargeable batteries to drive rotation of the wheels and movement of the modular accommodation space. According to certain aspects, the mobility elements 408 of a modular accommodation space using magnetic levitation (e.g., magnets on modular accommodation space) may provide connection to the power system (e.g., magnets of the 'roadway').

For electric powered motors, charging may be via self-charging from the road or a docked position, power and/or charging from a docked or racked position, powered via solar panels, etc. While specific examples of powering the mobility elements have been listed, others are possible and within the scope of the present invention.

A destination location for the modular accommodation space may be selected by the user, such as from a manual or electronic control panel within the modular accommodation space, or via a software application downloadable to an electronic device, such as a mobile phone, tablet, or computer. Alternatively, or additionally, the destination location of the modular accommodation space may be selected/controlled by authorized personnel, and access to such control may be selective.

Figure 16:
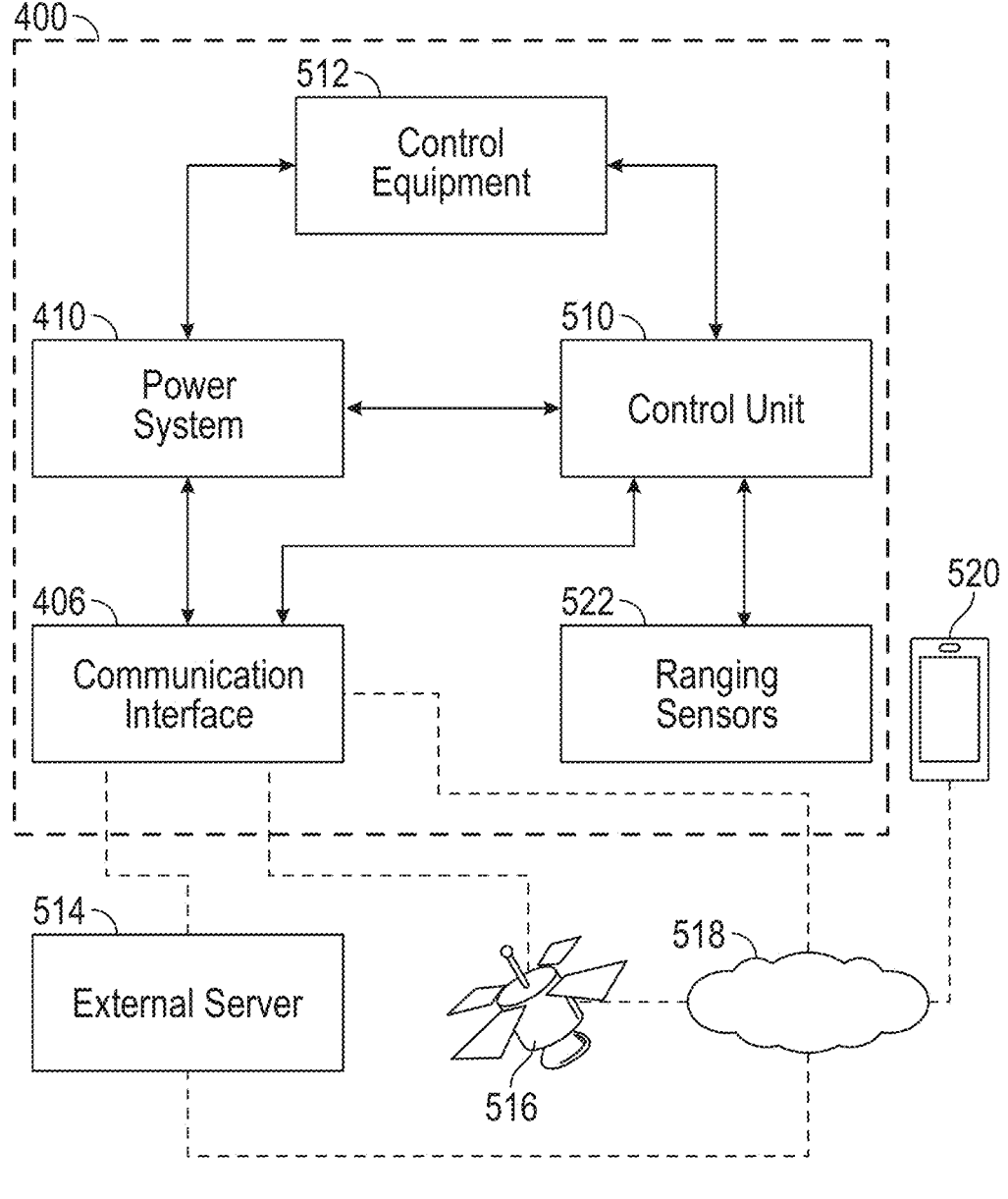
FIG. 16 is a block diagram illustrating portions of a control system for controlling the modular accommodation spaces according to aspects of the present disclosure.

For example, and with reference to FIG. 16, the modular accommodation space 400 may include a control unit 510 comprising one or more processors and one or more memory modules communicatively coupled to the one or more processors. The one or more memory modules store logic that, when executed by the one or more processors, allow a destination location to be selected for the modular accommodation space such that the moveable base or mobility elements 408 (equipment controlled by the control unit 510, i.e., control equipment 512) may automatically transfer the modular accommodation space from a first docked position to an undocked position, travel along a route to a new location, and transfer the space from the undocked position to a second docked position at the new location. The docked position may include a position within the parking loop, such as parked on a parking pad 14 or elevated to a position above the parking pad.

Transfer of the modular accommodation space from an undocked to a docked position may provide any or all of locking of the wheels provided on the base or any other mobility elements 408 configured for movement of the modular accommodation space; extension of steps to provide convenient entry and exit from the modular accommodation space; attachment to external electrical, plumbing, communication, and/or other connections; and/or extension of portions of the modular accommodation space, such as a porch area, or other interior regions of the modular accommodation space. Alternatively, transfer from a docked position to an undocked position may involve reversing each of the above indicated steps.

A user may interact with the control unit 510 via one or more control panels that may allow control of environmental conditions within the modular accommodation space. For example, the user may control any of: the temperature and/or humidity, the timing of changes to the environmental conditions, the lighting and timing thereof, power use and connectivity for various appliances within the modular accommodation space, and the like from the control panel.
Scheduling within the Parking Loop A user may use a software application to schedule a location within a parking loop. As used herein, the term "location" may refer to a specific location within a parking loop, i.e., a parking pad 14, an accommodation area 200 (either or both of the ground level portion and the loft portion), and/or an elevated position for a modular accommodation space; or the term location may refer to a geographic location, i.e., a specific parking loop.

The software application may be a downloadable or a web-based software application accessible by an electronic device. The user may select a location and schedule a time of arrival and departure from the location. The user may then travel to the location, such as in an RV, car, or modular accommodation space, or they may request to have a modular accommodation space transported to the location, such as pulled by a truck or on a flat-bed of a truck. Alternatively, the modular accommodation space may autonomously navigate to the location. In this later instance, selection of the location of the modular accommodation space may be communicated from the software application to the control unit 510 of the modular accommodation space, and the modular accommodation space may use positioning devices and/or ranging sensors 522, and software to navigate to the location.

According to certain aspects, the location may be owned by the user and/or the vehicle selected to occupy the location may be owned by the user. According to other aspects, the location may be owned by a primary user who may rent/lease the location to a secondary user and/or the vehicle (e.g., RV, modular accommodation space) may be owned by a primary user who may rent/lease vehicle to a secondary user. For example, a parking loop may be owned by a primary user who rents/leases parking pads and/or accommodation areas to secondary users. A plurality of modular accommodation spaces may be owned by a primary user who rents each modular accommodation space to secondary users, much as a hotel room or cabin at a resort, or as additional office space in an office building, or as an individual unit such as an RV rental. As such, the secondary user may communicate a desired location, such as within a parking loop or at a specific parking loop, and/or a reserve a modular accommodation space or RV through the software. Further, for mobile accommodation spaces, the user may communicate a desired location either directly to the modular accommodation space or through the primary user. That is, the user may rent the modular accommodation space and may communicate directly with the modular accommodation space, such as using a scheduling application, or may communicate with the primary user who may schedule and direct the destination location of the modular accommodation space.

According to certain aspects, the user may select more than one location within a parking loop (i.e., move from one parking loop to another, etc.), and/or more than one location for the modular accommodation space. The locations may be selected contemporaneously or may be scheduled in advance. When the vehicle is a modular accommodation space, movement from one location to another may include shipping or autonomous travel, such as described hereinabove.

As used herein, the term 'user' may refer to an individual who may be selecting/requesting a geographic location at which they would like their privately owned or rented/leased vehicle, e.g., RV or modular accommodation space, to be parked, and a date/time period for that location. Once a location and date/time selection is made, the term 'user' may refer to a management group or company that may receive the request via the software application. This latter user may be the owner of the parking loop and/or the rented/leased vehicle.

Accordingly, the present disclosure provides methods for scheduling one or more accommodations, i.e., parking pad, accommodation area, and/or modular accommodation spaces. The method may comprise receiving a request for a listing of accommodations available at any of the parking loops disclosed herein, or a modular accommodation space. The method may then include retrieving available accommodation information from one or more servers and generating the listing of accommodations available at the parking loop based on the available accommodation information. This listing of accommodations available at the parking loop may then be displayed on a user device, and a user selection of at least one of the available accommodations may be received from the user device. A reservation based on the user selection may then be generated.

The methods disclosed herein may be implemented via computer circuitry, as discussed herein, to provide a system comprising circuitry configured to execute the methods.
Logistics Engines The present disclosure provides methods to schedule use of various locations, such as within a parking loop, i.e., parking pad, accommodation area, and/or community space, and use of a modular accommodation space or RV and its access to a parking pad or elevated position thereover in the case of the modular accommodation spaces. Also disclosed are software applications that may enable such methods, and logistics engines that may optimize the software applications. The software application may be used with or without an account setup and may be provided online or via a downloaded application. The user may register a user-owned location and/or vehicle (e.g., RV, mobile accommodation space), select a location and/or vehicle for purchase or rental, provide personal information (e.g., address) and/or account preferences (e.g., preferred use locations, preferred use dates, etc.), and the like. As indicated hereinabove, a user may be an individual user or a group of users (e.g., location or vehicle owner, management group providing access to one or more locations or vehicles, such as a resort or a company scheduling locations or and/or vehicles, etc.).

Accordingly, a main function of at least one of the software applications disclosed herein includes scheduling. As such, the software application may comprise a logistics engine configured to: assign a unique address to a user and/or create a user account associated with the unique address; associate one or more locations and/or vehicles with the unique address, wherein the locations and/or vehicles are user owned or provided to the user via a third-party provider; and receive a request, from a user device associated with the user account, to schedule the selected location and/or deliver the selected vehicle (e.g., modular accommodation space) to location at a delivery date and time.

The software application may be further configured to: send a first request to a first shipper to pick up a selected modular accommodation space (e.g., selected using the software application, such as a modular accommodation space assigned to the user account or one offered for selection via the software application), and deliver the modular accommodation space to the user selected location. The user may elect to be updated on a status of their order (i.e., estimated delivery date and time, and/or updates on a current location of the modular accommodation space). Accordingly, the software application may further receive a notification from the first shipper that the modular accommodation space is at a first location (i.e., expected location), and send a second message to the user device, wherein the second message confirms or updates delivery details of the modular accommodation space (i.e., date, time, updates, tracking number, pickup and delivery notifications, and the like).

The software application may provide for search and booking of locations within a parking loop and/or modular accommodation spaces based on the amenities provided by each, i.e., configuration of the modular accommodation space or the accommodation area, type of parking loop (e.g., resort, work or repair location, etc.), location of the parking loop, and the like. The software application may allow the user to identify, via constrained or arbitrary search, amenities and/or special services (e.g., restaurants, spas, etc. in the community space, location of the parking loop near other services) available at or near the parking loop. In this sense, "arbitrary" means the user can enter search inputs other than those provided in a check-box list or other pre-determined list. Users are presented with amenities and services matching or related to their query items and are permitted to select and confirm desired feature options and book, reserve or purchase their selection (i.e., parking pad within a parking loop, modular accommodation area, RV, and the like). As such, the software application may be linked to a database that contains features associated with bookable items (parking pad within a parking loop, modular accommodation area, RV, and the like).

The software application may be configured to receive, from the user (i.e., via a client device or booking agent), a booking query based on the accommodation search constraints and receive from an external provider (i.e., owner of the selected parking loop, parking pad, accommodation area, mobile accommodation space, etc.) availability information for at least one accommodation provider satisfying the accommodation search constraints. The software may further be configured to receive, from the user (i.e., via a client device or booking agent), an indication of an acceptance of the offer to book and payment information; transmit the payment information to a payment processor, update an inventory record in the database to record the booking of the accommodation, and transmit a confirmation of the booking to the user.

The software applications according to the present disclosure may be configured to interact with users via a user device or via the control panel on a modular accommodation space, and with a range of service providers. The service providers may include parking loop owners, parking pad owners, modular accommodation space owners (individual users or modular accommodation space management groups), transportation providers for the modular accommodation spaces, and the like. As such, the system may include logistic servers that communicate through the internet with the user devices and service providers to coordinate reservation of the location(s) and/or modular accommodation space(s) from the owners (individuals or management groups renting out their parking loop spaces and/or modular accommodation spaces), transport and delivery by transport providers of a selected modular accommodation space, use of specific locations (i.e., within the parking loop), repair of modular accommodation space or RV by repair providers, and any of a large range of services (cleaning, reconfiguring, etc.). The logistics engine may act as an air traffic controller to coordinate communication among providers and timing of the various requested activities.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While the figures shown and discussed herein illustrate the present invention as configured for recreational vehicles, it should be understood to be equally useful for any road-configured vehicle. For example, a large truck may find the parking loops useful for extended rest stays between scheduled trips, or for maintenance and/or repair visits, etc. Moreover, vehicles that do not provide accommodation may find the parking loops useful a recreational or vacation destinations, providing unique accommodations, and/or for maintenance and/or repair visits that may be needed during travel.

The following aspects are provided in the present disclosure:

Aspect 1: A parking loop comprising a plurality of parking pads each having a surface configured to support a vehicle, the plurality of parking pads radially spaced about a central region; an access road positioned between two of the plurality of parking pads having a distal end terminating at the central region; and a turntable positioned within the central region and comprising an upper surface having a road portion extending across a diameter thereof, wherein the turntable is rotatable to align ends of the road portion with the distal end of the access road or one of the plurality of parking pads, wherein the vehicle is a road-configured vehicle or a road-transportable vehicle.

Aspect 2: The parking loop according to any previous aspect, wherein the vehicle comprises a car, truck, recreational-vehicle, bus, or modular accommodation space.

Aspect 3: The parking loop according to any previous aspect, further comprising: an accommodation area positioned at one or more of the plurality of parking pads, wherein the accommodation area comprises one or more rooms having a floor, a ceiling, and walls to provide a substantially enclosed interior space configured for use by human users.

Aspect 4: The parking loop according to any previous aspect, further comprising: an accommodation area positioned at one or more of the plurality of parking pads, wherein the accommodation area comprises a ground level portion and optionally a loft portion positioned over the parking pad and configured to not obstruct access of the vehicle to the parking pad, wherein either or both the ground level portion and the loft portion comprises the one or more rooms.

Aspect 5: The parking loop according to any previous aspect, further comprising: an accommodation area positioned at each of the plurality of parking pads, wherein the accommodation area comprises a ground level portion and a loft portion positioned over the parking pad and configured to not obstruct access of the vehicle to the parking pad, and wherein either or both the ground level portion and the loft portion comprises one or more rooms having a floor, a ceiling, and walls to provide a substantially enclosed interior space configured for use by human users; and a community space positioned over the central area and configured to not obstruct access of the vehicle to the turntable, wherein the community space comprises a floor, a ceiling, and walls to provide a substantially enclosed interior space configured for use by the human users, wherein the community space is accessible via the loft portion of each of the accommodation areas.

Aspect 6: The parking loop according to any previous aspect, wherein the accommodation area, the community space, or both comprise one or more interior spaces, wherein each of the one or more interior spaces is configured as a living space, a dining space, an office space, a workspace, a classroom space, a kitchen space, a medical space, a laboratory space, or a combination thereof.

Aspect 7: The parking loop according to any previous aspect, wherein each of the loft portions of the accommodation areas are connected via an outer walkway ring, wherein access to each of the accommodation areas from the walkway ring is individually controllable.

Aspect 8: The parking loop according to any previous aspect, wherein one or more of the plurality of parking pads includes a ground level cooking and eating area.

Aspect 9: The parking loop according to any previous aspect, wherein one or more of the plurality of parking pads is configured to provide maintenance access to an underside of the vehicle.

Aspect 10: The parking loop according to any previous aspect, wherein the turntable comprises: a control panel communicatively coupled with a motor and at least one sensor, wherein the at least one sensor communicates a position of one or both of: the turntable relative to the parking pads and the access road, and a position of the vehicle on the turntable, wherein a rotational speed and direction of the turntable is controlled by the motor based on signals receive from the control panel.

Aspect 11: The parking loop according to any previous aspect, wherein the turntable comprises: a circular support mounted by an axle upon a fixed support and rotatable relative thereto in alternate angularly displaced directions, a plurality of wheels or ball bearings radially spaced apart from the fixed support and providing structural support for the circular support, and a motor operatively coupled to the axle or one or more of the plurality of wheels.

Aspect 12: A high-density accommodation area comprising: a plurality of parking pads each having a surface configured to support a vehicle, the plurality of parking pads radially spaced about a central region; an accommodation area positioned at each of the plurality of parking pads, the accommodation area comprising a ground level portion and a loft portion, wherein the loft portion is positioned over the parking pad and configured to not obstruct access of the vehicle to the parking pad, wherein either or both the ground level portion and the loft portion comprises one or more rooms having a floor, a ceiling, and walls to provide a substantially enclosed interior space configured for use by human users; an access road positioned between two of the plurality of parking pads having a distal end terminating at the central region; and a turntable positioned within the central region and comprising an upper surface having a road portion extending across a diameter thereof, wherein the turntable is rotatable to align an end of the road portion with the distal end of the access road or one of the plurality of parking pads.

Aspect 13: The high-density accommodation area according to aspect 12, further comprising: a community space positioned over the central area and configured to not obstruct access of the vehicle to the turntable, wherein the community space comprises a floor, a ceiling, and walls to provide a substantially enclosed interior space configured for use by the human users, wherein the community space is accessible via the loft portion of each of the accommodation areas.

Aspect 14: A system for scheduling an accommodation space, the system comprising circuitry configured to: receive a request for a listing of accommodation spaces available at the parking loop according to any one of aspects 1 to 11 or the high-density accommodation area according to aspects 12 to 13 for a user selected date and time frame, wherein the accommodation spaces comprise one or more of a parking pad, an accommodation area, or a portion of a community space of the parking loop; retrieve available accommodation information from one or more servers and generate the listing of accommodation spaces available at the parking loop based on the available accommodation information; display, on a user device, the listing of accommodation spaces available at the parking loop; receive, from the user device, a user selection of at least one of the available accommodation spaces; and generate a reservation based on the user selection.

Aspect 15: The system according to aspect 14, wherein the accommodation spaces further comprise modular accommodation spaces positionable on one of the parking pads of the parking loop or in an elevated position above one of the parking pads.

Aspect 16: The system according to aspect 15, wherein the modular accommodation spaces comprise: a modular frame having a floor, a ceiling, four exterior walls, and one or more separate interior areas, a mobility element configured to allow the modular accommodation space to be moved from a first location or position to a second location or position, a power supply and electrical system, and a control system.

Aspect 17: A system of multi-use building units, the system comprising: a parking loop according to any one of aspects 1 to 11 or the high-density accommodation area according to aspects 12 to 13; and one or more modular accommodation spaces comprising: a modular frame having a floor, a ceiling, four exterior walls, and one or more separate interior areas, a mobility element configured to allow the modular accommodation space to be moved from a first location or position to a second location or position, a power supply and electrical system, and a control system, wherein the one or more modular accommodation spaces are positionable on one of the parking pads of the parking loop or in an elevated position above one of the parking pads.

Aspect 18: The system according to Aspect 17, wherein the mobility element of the modular accommodation space comprises attachment points for connectors configured to allow the modular accommodation space to be lifted to the elevated position over the parking pad; or wherein the mobility element of the modular accommodation space comprises wheels, tracks, magnets, or a combination thereof attached to a bottom surface of the modular frame and configured to allow the modular accommodation space to travel on a flat surface; or wherein the mobility element of the modular accommodation space comprises a base plate removeably attachable to a bottom surface of the modular frame and configured to allow the modular accommodation space to travel on a flat surface, wherein the base plate comprises one or more wheels, one or more tracks, one or more magnets, or a combination thereof.

Aspect 19: The system according to Aspect 17 or 18, wherein the control system of the modular accommodation space directs actions of the mobility element and the electrical system based on user input.

Aspect 20: The system according to any one of Aspects 17 to 19, wherein the one or more separate interior areas of the one or more modular accommodation spaces comprise any one or more of a living space, a dining space, an office space, a workspace, a classroom space, a kitchen space, a bedroom, a bathroom, a medical space, a laboratory space.

Accordingly, while particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A parking loop comprising:
a plurality of parking pads each having a surface configured to support a vehicle, the plurality of parking pads radially spaced about a central region;
at least one access road positioned between two of the plurality of parking pads having a distal end terminating at the central region; and
a turntable positioned within the central region and comprising an upper surface having a road portion extending across a diameter thereof, wherein the turntable is rotatable to align ends of the road portion with the distal end of the access road or one of the plurality of parking pads;
wherein two or more of the plurality of parking pads each include an individual accommodation area positioned at a radially distal end of the parking pad, wherein each of the individual accommodation areas comprise a ground level portion and a loft portion positioned over the parking pad and configured to not obstruct access of the vehicle to the parking pad, wherein either or both the ground level portion and the loft portion comprises one or more rooms having a floor, a ceiling, and walls to provide a substantially enclosed interior space configured for use by human users,
wherein the vehicle is a road-configured vehicle or a road-transportable vehicle.

2. The parking loop of claim 1, wherein the vehicle comprises a car, truck, recreational-vehicle, bus, or modular accommodation space.

3. The parking loop of claim 1, wherein the turntable comprises:
a control panel communicatively coupled with a motor and at least one sensor, wherein the at least one sensor communicates a position of one or both of: the turntable relative to the parking pads and the access road, and a position of the vehicle on the turntable,
wherein a rotational speed and direction of the turntable is controlled by the motor based on signals received from the control panel.

4. The parking loop according claim 1, comprising:
one or more modular accommodation spaces comprising:
a modular frame having a floor, a ceiling, four exterior walls, and one or more separate interior areas,
a mobility element configured to allow the modular accommodation space to be moved from a first location or position to a second location or position,
a power supply and electrical system, and
a control system,
wherein each of the one or more modular accommodation spaces are positionable on one of the parking pads of the parking loop or in an elevated position above one of the parking pads of the parking loop.

5. The parking loop of claim 4, wherein the mobility element of the modular accommodation space comprises attachment points for connectors configured to allow the modular accommodation space to be lifted to the elevated position over the parking pad.

6. The parking loop of claim 4, wherein the mobility element of the modular accommodation space comprises wheels, tracks, magnets, or a combination thereof attached to a bottom surface of the modular frame and configured to allow the modular accommodation space to travel on a flat surface; or wherein the mobility element of the modular accommodation space comprises a base plate removeably attachable to a bottom surface of the modular frame and configured to allow the modular accommodation space to travel on a flat surface, wherein the base plate comprises one or more wheels, one or more tracks, one or more magnets, or a combination thereof.

7. The parking loop of claim 4, wherein the control system of the modular accommodation space directs actions of the mobility element and the electrical system based on user input.

8. The parking loop of claim 4, wherein the one or more separate interior areas of the one or more modular accommodation spaces comprise any one or more of a living space, a dining space, an office space, a workspace, a classroom space, a kitchen space, a bedroom, a bathroom, a medical space, a laboratory space.

9. An accommodation area comprising two or more parking loops according to claim 1, wherein the two or more parking loops are connected via the access road, a main road, or both.

10. A parking loop comprising:
a plurality of parking pads each having a surface configured to support a vehicle, the plurality of parking pads radially spaced about a central region;
an access road positioned between two of the plurality of parking pads having a distal end terminating at the central region;
a turntable positioned within the central region and comprising an upper surface having a road portion extending across a diameter thereof, wherein the turntable is rotatable to align ends of the road portion with the distal end of the access road or one of the plurality of parking pads;
an accommodation area positioned at each of the plurality of parking pads, wherein the accommodation area comprises a ground level portion and a loft portion positioned over the parking pad and configured to not obstruct access of the vehicle to the parking pad, and wherein either or both the ground level portion and the loft portion comprises one or more rooms having a floor, a ceiling, and walls to provide a substantially enclosed interior space configured for use by human users; and a community space positioned over the central area and configured to not obstruct access of the vehicle to the turntable, wherein the community space comprises a floor, a ceiling, and walls to provide a substantially enclosed interior space configured for use by the human users, wherein the community space is accessible via the loft portion of each of the accommodation areas, wherein the vehicle is a road-configured vehicle or a road-transportable vehicle.

11. The parking loop of claim 10, wherein the accommodation area, the community space, or both comprise one or more interior spaces, wherein each of the one or more interior spaces is configured as a living space, a dining space, an office space, a workspace, a classroom space, a kitchen space, a medical space, a laboratory space, or a combination thereof.

12. The parking loop of claim 10, wherein each of the loft portions of the accommodation areas are connected via an outer walkway ring, wherein access to each of the accommodation areas from the walkway ring is individually controllable.

13. An accommodation area comprising two or more parking loops according to claim 10, wherein the two or more parking loops are connected via the access road, a main road, or both.

14. A parking loop comprising:
a plurality of parking pads each having a surface configured to support a vehicle, the plurality of parking pads radially spaced about a turntable; the turntable comprising an upper surface having a road portion extending across a diameter thereof; and an access road positioned between two of the plurality of parking pads having a distal end terminating at the turntable; and wherein the turntable is rotatable to align ends of the road portion with the distal end of the access road or one of the plurality of parking pads, wherein the vehicle is a road-configured vehicle or a road-transportable vehicle, and wherein two or more of the plurality of parking pads each include a ground level outdoor cooking and eating area at a distal end thereof opposite a proximal end that is adjacent the turntable.

15. An accommodation area comprising two or more parking loops according to claim 14, wherein the two or more parking loops are connected via the access road, a main road, or both.

16. The parking loop of claim 14, wherein one or more of the plurality of parking pads comprise a sunken region or a lift configured to provide access to an underside of the vehicle parked on the parking pad for maintenance of the vehicle.

17. A parking loop comprising:
a plurality of parking pads each having a surface configured to support a vehicle, the plurality of parking pads radially spaced about a central region;

an access road positioned between two of the plurality of parking pads having a distal end terminating at the central region; and a turntable positioned within the central region and comprising an upper surface having a road portion extending across a diameter thereof, wherein the turntable is rotatable to align ends of the road portion with the distal end of the access road or a proximal end of one of the plurality of parking pads, wherein the vehicle is a road-configured vehicle or a road-transportable vehicle, wherein one or more of the plurality of parking pads comprise a sunken region or a lift configured to provide access to an underside of the vehicle parked on the parking pad for maintenance of the vehicle, and wherein two or more of the plurality of parking pads each include an individual accommodation area positioned at a radially distal end of the parking pad, wherein each of the individual accommodation areas comprise a ground level portion and a loft portion positioned over the parking pad and configured to not obstruct access of the vehicle to the parking pad, wherein either or both of the ground level portion and the loft portion comprise one or more rooms having a floor, a ceiling, and walls to provide a substantially enclosed interior space configured for use by human users.

18. A parking loop comprising:
a plurality of parking pads each having a surface configured to support a vehicle, the plurality of parking pads radially spaced about a central region;

at least one access road positioned between two of the plurality of parking pads having a distal end terminating at the central region; and a turntable positioned within the central region and comprising an upper surface having a road portion extending across a diameter thereof, wherein the turntable is rotatable to align ends of the road portion with the distal end of the access road or one of the plurality of parking pads;

wherein two or more of the plurality of parking pads each include an individual accommodation area positioned at a radially distal end of the parking pad, wherein each of the individual accommodation areas comprise one or more rooms having a floor, a ceiling, and walls to provide a substantially enclosed interior space configured for use by human users, wherein the vehicle is a road-configured vehicle or a road-transportable vehicle, wherein the parking loop further comprises:
a system for scheduling an accommodation space at the parking loop, the system comprising circuitry configured to:
receive a request for a listing of accommodation spaces available at the parking loop for a user selected date and time frame, wherein the accommodation spaces comprise one or more of an available parking pad, an available parking pad with an available accommodation area, or an available portion of a community space of the parking loop;

retrieve available accommodation information from one or more servers and generate the listing of accommodation spaces available at the parking loop based on the available accommodation information;

display, on a user device, the listing of accommodation spaces available at the parking loop;

receive, from the user device, a user selection of at least one of the available accommodation spaces; and generate a reservation based on the user selection.

19. The parking loop of claim 18, wherein the accommodation spaces further comprise available modular accommodation spaces positionable on one of the parking pads of the parking loop or in an elevated position above one of the parking pads.

20. The parking loop of claim 19, wherein the modular accommodation spaces comprise:

a modular frame having a floor, a ceiling, four exterior walls, and one or more separate interior areas, a mobility element configured to allow the modular accommodation space to be moved from a first location or position to a second location or position, a power supply and electrical system, and a control system.

\* \* \* \* \*